US007284007B1

(12) United States Patent
Francicus de Heer et al.

(10) Patent No.: US 7,284,007 B1
(45) Date of Patent: Oct. 16, 2007

(54) METHODS OF CAPTURING CATALOG DATA

(75) Inventors: Albert Henricus Francicus de Heer, Blonay (CH); Rudolf Cornelius Wilhelmus de Heer, Vucherens (CH); Constantin Nickolayvich Zabrodine, Vevey (CH); Alexandre Igorevitch Kviatkevitch, Légier (CH); Eric Oscar Blaettler, Lausanne (CH)

(73) Assignee: CNET Europe SA, Saint-Legier (CH)

( * ) Notice: Subject to any disclaimer, the term of this patent is extended or adjusted under 35 U.S.C. 154(b) by 307 days.

(21) Appl. No.: 09/625,745

(22) Filed: Jul. 26, 2000

(51) Int. Cl.
G06F 17/00 (2006.01)

(52) U.S. Cl. .................. 707/102; 707/104.1; 707/101; 707/100; 707/4

(58) Field of Classification Search ............ 707/104.1, 707/3, 4, 10, 100, 102, 103 R; 705/8, 28, 705/26–27; 709/203, 217, 27; 713/1; 717/178
See application file for complete search history.

(56) References Cited

U.S. PATENT DOCUMENTS

| | | | | |
|---|---|---|---|---|
| 4,992,940 A | * | 2/1991 | Dworkin ....................... | 705/26 |
| 5,319,542 A | * | 6/1994 | King et al. .................... | 705/27 |
| 5,630,125 A | * | 5/1997 | Zellweger .................... | 707/103 R |
| 5,675,784 A | * | 10/1997 | Maxwell et al. ............. | 345/803 |
| 5,715,444 A | | 2/1998 | Danish et al. ................ | 707/4 |
| 5,737,736 A | * | 4/1998 | Chang ......................... | 345/835 |
| 5,740,425 A | * | 4/1998 | Povilus ........................ | 707/100 |
| 5,890,175 A | | 3/1999 | Wong et al. | |
| 5,913,210 A | * | 6/1999 | Call ............................. | 705/20 |
| 5,999,914 A | * | 12/1999 | Blinn et al. ................... | 705/14 |
| 6,029,141 A | * | 2/2000 | Bezos et al. .................. | 705/27 |
| 6,076,091 A | * | 6/2000 | Fohn et al. ................... | 707/102 |
| 6,078,924 A | * | 6/2000 | Ainsbury et al. ........... | 707/101 |

(Continued)

FOREIGN PATENT DOCUMENTS

WO WO97/15886 1/1997

OTHER PUBLICATIONS

MWS: Yoegel, Rob; "Global Selling on the Internet," Target Marketing, Mar. 1997, v20n3p106, 108+, Dialog file 13 #1044605.

(Continued)

*Primary Examiner*—Sana Al-Hashemi
(74) *Attorney, Agent, or Firm*—Marc S. Kaufman; Daniel Song; Nixon Peabody, LLP

(57) ABSTRACT

An invention is described herein that provides methods and apparatus for collecting, distributing and storing product data. A data structure suitable for use in collecting, distributing or storing product data for use in a catalog is disclosed. More particularly, the data structure is based on a data model having one or more classes, where each of the classes has one or more associated categories. The data structure includes at least one class definition, each class definition being arranged to identify one or more associated categories. In addition, the data structure includes a plurality of category definitions, each category definition being arranged to identify an associated attribute group. The data structure further includes a plurality of attribute group definitions, where each attribute group definition is arranged to identify one or more attributes that are associated with the attribute group. In order to assist in the capture of data, each attribute has an associated possible value list that identifies values that are selectable as values for the associated attribute.

31 Claims, 37 Drawing Sheets

U.S. PATENT DOCUMENTS

| | | | | |
|---|---|---|---|---|
| 6,128,600 | A | * | 10/2000 | Imamura et al. .............. 705/27 |
| 6,154,738 | A | * | 11/2000 | Call ............................ 705/20 |
| 6,411,947 | B1 | * | 6/2002 | Rice et al. .................... 706/46 |
| 6,460,040 | B1 | * | 10/2002 | Burns ........................... 707/10 |
| 6,618,753 | B2 | * | 9/2003 | Holland et al. ............. 709/217 |
| 6,618,758 | B1 | | 9/2003 | Ubowski |
| 2001/0027350 | A1 | | 10/2001 | Koga et al. |

OTHER PUBLICATIONS

MWS: Carr, Steve; "Amp Online Catalog Shows Way to Support Languages ", Business Marketing, Jan. 1998, Dialog file 13 #1070667.

MWS: Blankenhorn, Dana; "Amp Online Catalog Shows Way to Support Languages ", Business Marketing, Jan. 1998, Dialog file 13 #1070667.

Stevens, Tim; "Set Sale on the Net," Industry Week, Apr. 21, 1997, v246n8p56-58, 62+, Dialog file 13 #1042278.

UU; News Release, "Interactive PC-based Cataloging System Available from Phillips Petroleum Company Controls Complex Inventories Worldwide," Apr. 12, 1989, Dialog file 621 #1104977.

VV: Cox, John; CommunicationsWeek, "Scheme Aims to Help info Seekers," Apr. 4, 1994, Dialog file 16 #03308791.

* cited by examiner

FIG. 3-1

| Class / Cat | Info Level 1 2 3 | Main Search Attribute |
|---|---|---|
| ⊟ 📁 Systems ~502 | | Platform / ... |
| ⊞ 📁 Desktop / Deskside ~504 | ☐☐☒ | Processor / Speed / Form Factor |
| ⊞ 📁 Laptop ~506 | ☐☐☒ | Processor / Speed |
| ⊞ 📁 Handheld / PDA ~508 | ☐☒☒ | Device Type |
| ⊞ 📁 CPU Upgrade ~510 | ☐☒☒ | Processor / Speed |
| ⊞ 📁 Mainboard ~512 | ☐☒☒ | Form Factor |
| ⊞ 📁 Cabinet ~514 | ☐☒☒ | Form Factor |
| ⊞ 📁 UPS & Power ~516 | ☐☒☒ | Type / Capacity |
| ⊞ 📁 Battery ~518  520 | ☒☒☐ | Device Type |
| ⊞ 📁 Docking & Connectivity ⌐ | ☐☒☒ | Device Type |
| ⊞ 📁 Portable Accessory ~522 | ☒☒☐ | Accessory Type |
| ⊞ 📁 Service & Support ~524 | ☒☒☐ | Service Type |
| ⊟ 📁 Memory ~504 | | Platform / ... |
| ⊞ 📁 Standard RAM | ☒☒☐ | Form Factor / Type |
| ⊞ 📁 Video Memory | ☒☒☐ | Upgrade Type |
| ⊞ 📁 Cache Memory | ☒☒☐ | Upgrade Type |
| ⊞ 📁 Flash Memory | ☒☒☐ | Upgrade Type |
| ⊞ 📁 ROM | ☒☒☐ | Upgrade Type |
| ⊞ 📁 Memory Adapter | ☒☒☐ | Adapter Type |
| ⊞ 📁 Memory Accessory | ☒☒☐ | Accessory Type |
| ⊟ 📁 Storage ~506 | | Platform / ... |
| ⊞ 📁 Hard Drive | ☐☒☒ | Form Factor / Type |
| ⊞ 📁 Disk Array (RAID) | ☐☐☒ | Device Type |
| ⊞ 📁 Removable Disk Drive | ☐☐☒ | Form Factor / Type |
| ⊞ 📁 Removable Tape Drive | ☐☐☒ | Form Factor / Type |
| ⊞ 📁 Network Storage | ☐☐☒ | Device Type |
| ⊞ 📁 Removable Media | ☒☒☐ | Media Type |
| ⊞ 📁 Storage Adapter | ☐☒☒ | Adapter Type |
| ⊞ 📁 Storage Cable | ☐☒☒ | Cable Type |
| ⊞ 📁 Storage Cabinet | ☐☒☒ | Form Factor |
| ⊞ 📁 Storage Accessory | ☒☒☐ | Accessory Type |
| ⊞ 📁 Service & Support | ☒☒☐ | Service Type |

FIG. 3-2

| Class / Cat | Info Level 1 2 3 | Main Search Attribute |
|---|---|---|
| 📁 Input ~508 | | Platform / ... |
| 📄 Key-Entry Device | ☐ ☒ ☒ | Type / Connection |
| 📄 Pointing Device | ☐ ☒ ☒ | Type / Connection |
| 📄 Game Controller | ☐ ☒ ☒ | Type / Connection |
| 📄 Scanner | ☐ ☒ ☒ | Device Type |
| 📄 Bar Code Reader | ☐ ☒ ☒ | Form Factor / Type |
| 📄 Audio Input | ☐ ☒ ☒ | Device Type |
| 📄 Video Input | ☐ ☒ ☒ | Form Factor / Type |
| 📄 Input Adapter | ☐ ☒ ☒ | Adapter Type |
| 📄 Input Cable | ☐ ☒ ☒ | Cable Type |
| 📄 Input Accessory | ☒ ☒ ☐ | Accessory Type |
| 📄 Service & Support | ☒ ☒ ☐ | Service Type |
| 📁 Output ~510 | | Platform / ... |
| 📄 Desktop Monitor | ☐ ☒ ☒ | Type / Size |
| 📄 Presentation Monitor | ☐ ☒ ☒ | Type / Size |
| 📄 Projector & Panel | ☐ ☒ ☒ | Form Factor / Type |
| 📄 Printer | ☐ ☒ ☒ | Type / Productivity |
| 📄 Audio | ☐ ☒ ☒ | Device Type |
| 📄 Video Adapter | ☐ ☒ ☒ | Type / Interface |
| 📄 Audio Adapter | ☐ ☒ ☒ | Type / Interface |
| 📄 Output Cable | ☐ ☒ ☒ | Cable Type |
| 📄 Printer Consumable | ☒ ☒ ☐ | Consumable Type |
| 📄 Output Accessory | ☒ ☒ ☐ | Accessory Type |
| 📄 Service & Support | ☒ ☒ ☐ | Service Type |
| 📁 Network ~512 | | Platform / ... |
| 📄 Modem | ☐ ☒ ☒ | Form Factor / Type |
| 📄 Communication | ☐ ☒ ☒ | Device Type |
| 📄 Access Point | ☐ ☒ ☒ | Device Type |
| 📄 Multiplexor | ☐ ☒ ☒ | Device Type |
| 📄 Repeater / Bridge | ☐ ☒ ☒ | Device Type |
| 📄 Hub / Switch | ☐ ☒ ☒ | Device Type |
| 📄 Router | ☐ ☒ ☒ | Device Type |

FIG. 3-3

| Class / Cat | Info Level 1 2 3 | Main Search Attribute |
|---|---|---|
| ⊞ 🗀 Network Adapter | ☐ ☒ ☒ | Adapter Type |
| ⊞ 🗀 Network Cable | ☐ ☒ ☒ | Cable Type |
| ⊞ 🗀 Network Accessory | ☒ ☒ ☐ | Accessory Type |
| ⊞ 🗀 Service & Support | ☒ ☒ ☐ | Service Type |
| ⊟ 📂 Software ~514 | | Platform / ... |
| ⊞ 🗀 Application | ☐ ☒ ☒ | OS Type |
| ⊞ 🗀 Operating System | ☒ ☒ ☐ | Category / Type |
| ⊞ 🗀 Service & Support | ☒ ☒ ☐ | Service Type |

FIG. 4-1

| Systems - Desktop / Deskside Attribute | Priority | Srch. | Value List Name | Multi-Valued | Units List Name |
|---|---|---|---|---|---|
| AA Desktop / Deskside ~602 608 High (Medium) Priority Attributes 126 (62) | | | Search Attributes 42 ~622 | | |
| Header (G00063) | | | 624 | | |
| A00603 Compatibility | 1 | ☒ | Product Compatibility | ☒ | |
| A00604 Localization | 1 | ☒ | Product Localization | ☒ | . |
| A00605 Country Kits | 1 | ☒ | Product Country Kit | ☒ | |
| A00600 Product Line | 1 | ☒ | | ☐ | |
| A00601 Model | 1 | ☒ | | ☐ | |
| A00630 Manufacturer 610 | 1 | ☒ | | ☐ | |
| System (G00050) → Attribute Group ~604 | | | | | |
| A00432 Type ~612 Attribute | 1 | ☒ | General System Type | ☒ | |
| A00431 Designation ~614 606 | 1 | ☒ | General Product Designation | ☒ | |
| Cabinet / Chassis (G00007) | | | | | |
| A00031 Built-in-Devices | 2 | ☐ | Cabinet Built-in-Devices | ☒ | |
| A00030 Form Factor | 1 | ☒ | Cabinet Form Factor | ☐ | |
| Processor (G00008) ~616 | | | | | |
| A00036 Form Factor | 1 | ☒ | Component Form factor | ☐ | |
| A00037 Installed Qty | 1 | ☒ | Numeric Entry | ☐ | |
| A00038 Max Supported Qty | 1 | ☒ | Numeric Entry | ☐ | |
| A00039 Manufacturer | 1 | ☒ | Processor Manufacturer | ☐ | |
| A00041 Instruction Set | 2 | ☐ | Processor Instruction Set | ☐ | |
| A00042 Upgradability ~618 | 1 | ☒ | Component Upgradability | ☐ | |
| A00043 Math Coprocessor | 2 | ☐ | Component Form factor | ☐ | |
| A00044 Cache Level 1 Size | 2 | ☐ | Numeric Entry | ☐ | Data Size (Bytes) |
| A00045 Architecture Features ~622 | 2 | ☐ | Processor Features | ☒ | |
| A00040 Clock Speed ~620 | 1 | ☒ | Numeric Entry | ☐ | Frequency Units |
| A00035 Type | 1 | ☒ | Processor Type | ☐ | |

FIG. 4-2

| Mainboard (G00009) | | | | |
|---|---|---|---|---|
| A00050 Chipset Type | 2 | ☐ Chipset Vendor / Type | ☐ | |
| A00051 BIOS Type | 2 | ☐ Mainboard BIOS Vendor / Type | ☐ | |
| A00049 Data Bus Speed | 1 | ☒ Bus Clock Speed | ☐ | Frequency Units |
| Memory / Cache (G00046) | | | | |
| A00398 Form Factor | 2 | ☐ Memory Form Factor | ☐ | |
| A00399 Technology | 1 | ☐ Memory Technology | ☐ | |
| A00400 Installed Size | 1 | ☒ Numeric Entry | ☐ | Data Size (Bytes) |
| A00401 Max Supported Size | 1 | ☒ Numeric Entry | ☐ | Data Size (Bytes) |
| A00397 Type | 1 | ☐ Memory Type | ☐ | |
| A00407 Upgrade Rule | 2 | ☐ Upgrade Rule | ☐ | |
| Memory / RAM (G00010) | | | | |
| A00053 Installed Size | 1 | ☒ Numeric Entry | ☐ | Data Size (Bytes) |
| A00054 Soldered Size | 2 | ☐ Numeric Entry | ☐ | Data Size (Bytes) |
| A00055 Max Supported Size | 1 | ☒ Numeric Entry | ☐ | Data Size (Bytes) |
| A00056 Technology | 1 | ☒ Memory Technology | ☐ | |
| A00057 Data Integrity Check | 2 | ☐ Memory Error Correction | ☐ | |
| A00058 Features | 2 | ☐ Memory Features | ☒ | |
| A00059 Supply Voltage | 2 | ☐ Voltage | ☐ | Voltage Units |

FIG. 8C

ATTRIBUTE TABLE — 846

- SYSTEM_SKU1 — 848
- ATTRIBUTE_ID1 — 850
- VALUE_ID1 — 852
- UNIT_ID1 — 854
- ⋮
- SYSTEM_SKUN
- ATTRIBUTE_IDN
- VALUE_IDN
- UNIT_IDN

— SINGLE ATTRIBUTE
— MULTIPLE ATTRIBUTE

REPEATING ATTRIBUTE TABLE — 856

- SYSTEM_SKU1 — 848
- ATTRIBUTE_ID1 — 850
- VALUE_ID1 — 852
- UNIT_ID1 — 854
- SET#1 — 858
- ⋮
- SYSTEM_SKUN
- ATTRIBUTE_IDN
- VALUE_IDN
- UNIT_IDN
- SET#N

— REPEATING ATTRIBUTE

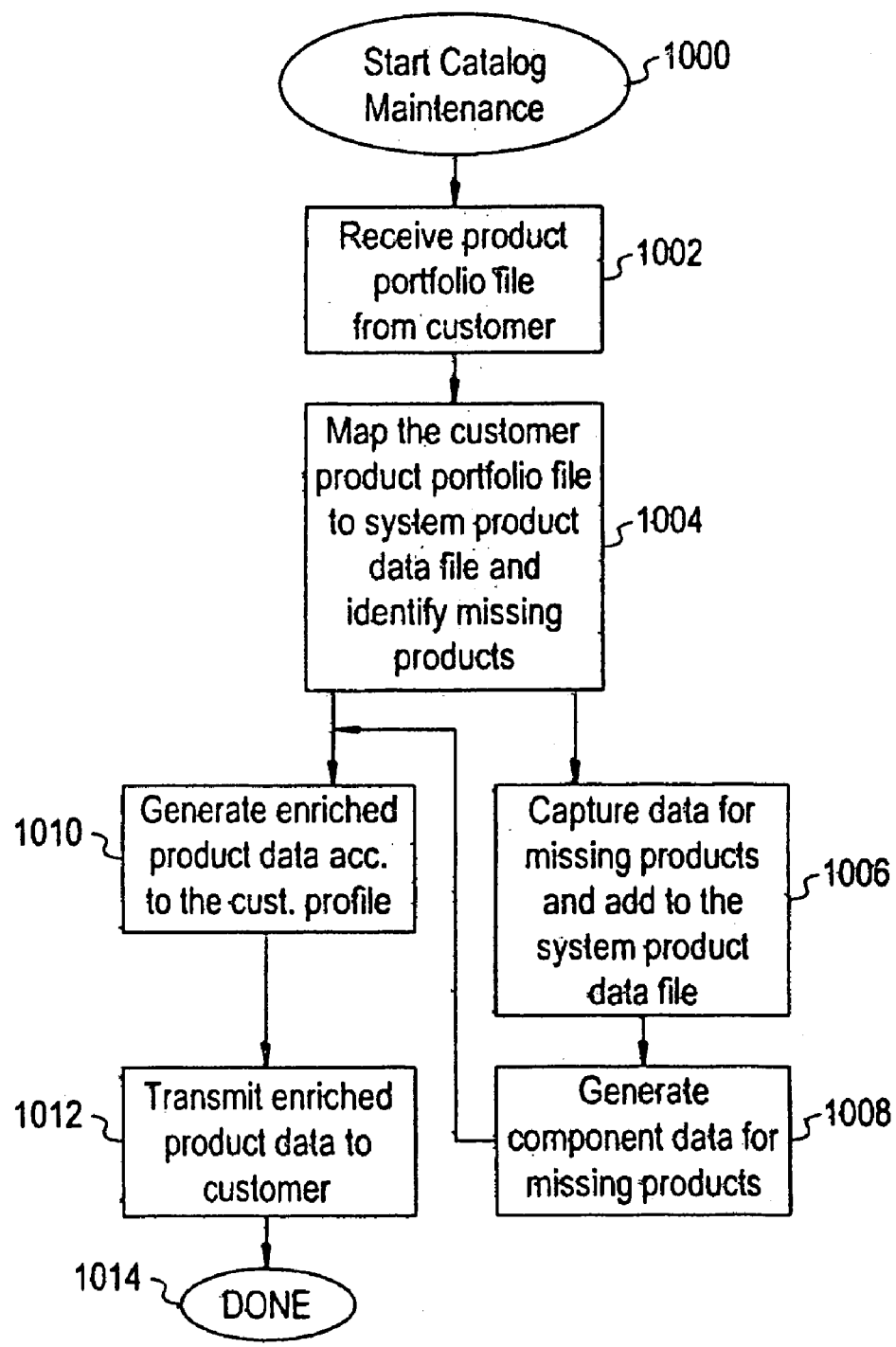

FIG. 10B

| CUSTOMER PRODUCT PORTFOLIO FILE |
|---|
| MANUFACTURER_SKU1 ~1016<br>CUSTOMER_SKU1 ~1018<br>MANUFACTURER_NAME1 ~1020<br>SHORT PRODUCT DESCRIPTION1 ~1022<br>.<br>.<br>.<br>MANUFACTURER_SKUN<br>CUSTOMER_SKUN<br>MANUFACTURER_NAMEN<br>SHORT PRODUCT DESCRIPTIONN |

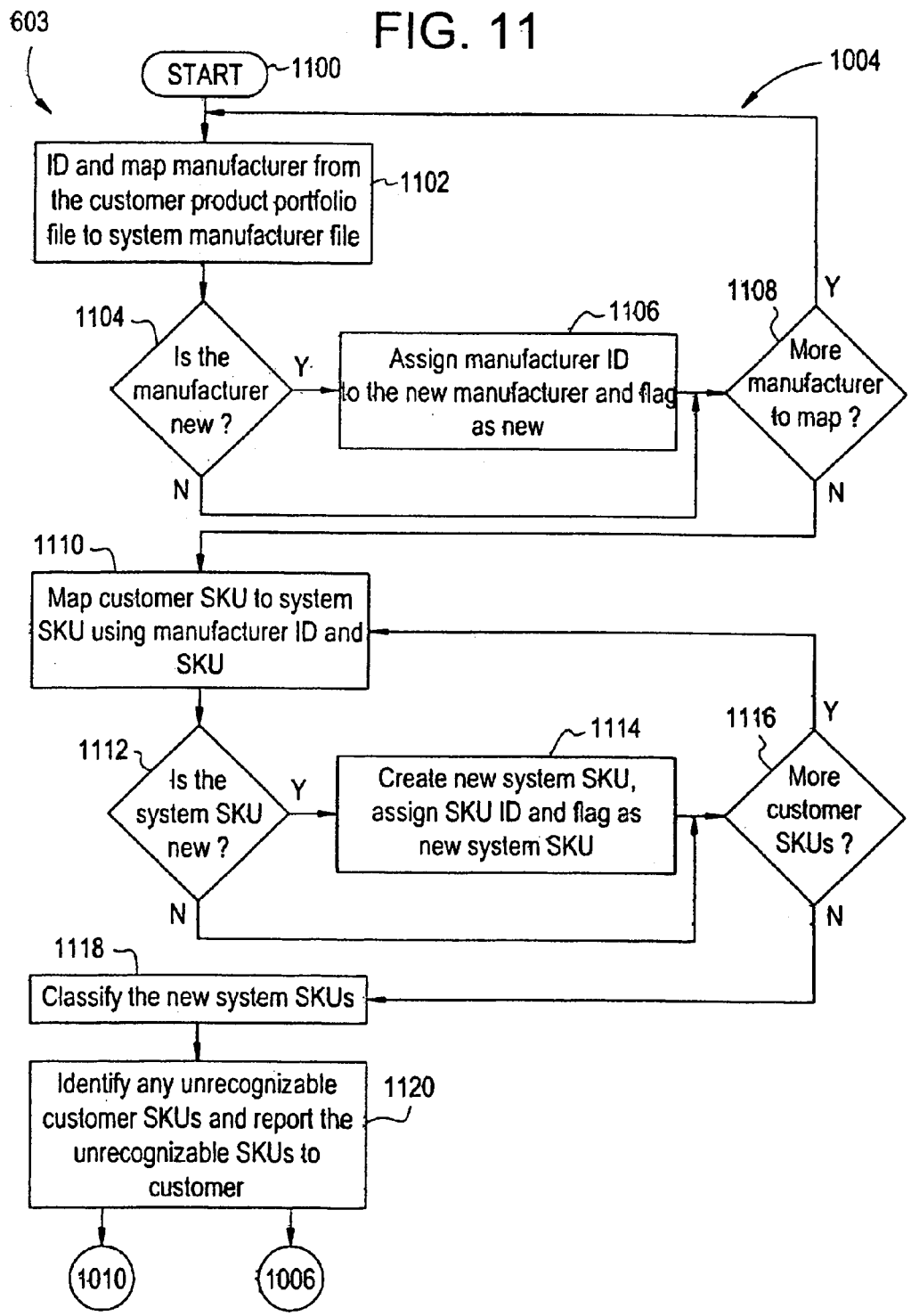

FIG. 12B-1

Vendor: IBM — 1228
Vendor SKU: 37E74FR — 1230
Product Line: Aptiva E — 1232
Model: 2100 — 1234
Vendor Product Description: — 1236
Aptiva E 2137-E74 K6 300 MMX evolue-48 Mo-256K cache-4, 2 Go-CD 24X-Carte Crystal 4237 B-MT-Comm 56Kbps-W95-Ecran 15"

GDT SKU: — 1238
Category: Desktop/Deskside — 1240

— 1226

Completion constraint I

| Completion Status | V | Username | Date/Time | Pages |
|---|---|---|---|---|
| Additional values requested | | | | |
| Requested values created | | | | |
| All mandatory attributes researched | | | | |
| Form transmitted to data capture | | | | |
| Data capture completed | | | | |
| Data checked | | | | |

1242 — Username
1244 — Date/Time
1246 — Additional values requested
1248 — All mandatory attributes researched
1250 — Data capture completed
1252 — Data checked

FIG. 12B-2

System - Type (Mandatory / Multi Value)
  N/A | Network Computer | Personal Computer | Server | Workstation |

System - Designation (Mandatory / Multi Value)
  N/A | Corporate Business | Home Use | Small Business |

Cabinet - Form Factor (Mandatory / Single Value)
  N/A | Desktop | Desktop Slimline | Full Tower | Mid Tower | Mini Tower | Portable | Proprietary | Rack |

Cabinet - Built-in Devices (Optional / Multi Value)
  N/A | None | Copier | Display | Keyboard | Microphone | Mouse | Pointing Stick | Printer | Scanner | Speaker | Status LCD | Stereo Speakers | Touchpad | Trackball |

Processor - Type (Mandatory / Single Value)
  N/A | None | 6X86 | 6X86MX | 80186 | 80286 | 80386 | 80486 | 8086 | Celeron | JF-33 | K6 MMX | K6-2 | MediaGX | MIPS Processor | Pentium | Pentium II MMX | Pentium II Xeon | Pentium MMX | Pentium Pro | Power PC 603 | Power PC 604e | Power PC G3 | Sonet RISC 4700 |

Processor - Form Factor (Mandatory / Single Value) ~1260         ~1254
  N/A | External | Integrated | Internal | Plug-in Card | Plug-in Module |   ~1256   } 1258

Processor - Installed Qty (Mandatory / Single Value)
  N/A | 0 | 1 | 12 | 128 | 144 | 15 | 16 | 160 | 18 | 192 | 196 | 2 | 20 | 24 | 256 | 288 | 3 | 32 | 35 | 384 | 4 | 40 | 468 | 48 | 512 | 56 | 6 | 64 | 72 | 768 | 8 | 80 | 90 | 96 | 96 | 960 |

Processor - Max Supported Qty (Mandatory / Single Value)
  N/A | 0 | 1 | 12 | 128 | 144 | 15 | 16 | 160 | 18 | 192 | 196 | 2 | 20 | 24 | 256 | 288 | 3 | 32 | 35 | 384 | 4 | 40 | 468 | 48 | 512 | 56 | 6 | 64 | 72 | 768 | 8 | 80 | 90 | 96 | 96 | 960 |

Processor - Upgradability (Mandatory / Single Value)
  N/A | Not Upgradable | Upgradable |

Processor - Manufacturer (Mandatory / Single Value)
  N/A | AMD | Cyrix | DEC | IBM | Intel | MIPS | Motorola |

Processor - Clock Speed (Mandatory / Single Value)
  N/A | 100 | 120 | 133 | 150 | 16 | 166 | 180 | 200 | 233 | 25 | 266 | 300 | 33 | 333 | 350 | 400 | 450 | 50 | 60 | 66 | 7.37 | 75 | 8 | 90 |
  Hz | KHz | MHz | GHz |

Processor - Instuction Set (Optional / Single Value)
  N/A | CISC x86 | IA-64 | RISC | x86-to-RISC |

Processor - Math Coprocessor (Optional / Single Value)
  N/A | External | Integrated | Internal | Plug-in Card | Plug-in Module |

Processor - Primary Cache Size (Optional / Single Value)
  N/A | 0 | 1 | 12 | 128 | 144 | 15 | 16 | 160 | 18 | 192 | 196 | 2 | 20 | 24 | 256 | 288 | 3 | 32 | 35 | 384 | 4 | 40 | 468 | 48 | 512 | 56 | 6 | 64 | 72 | 768 | 8 | 80 | 90 | 96 | 96 | 960 |
  Byte | KB | MB | GB | TB |

Processor - Compliant Standards (Optional / Multi Value)
  N/A | 100MHz Front Side Bus | AltiVec | Data Dependency Removal | Dual Independent Bus | Dynamic Execution | IEEE 754-compatible FPU | MMX instructions set | Multi-Branch Prediction | Out-Of-Order Completion | Register Renaming | SEC Cartridge Packing | Sixth-generation | Socket 7-compatible | Speculative Execution | Superpipelined | Superscalar | System Management Mode (SMM) |

FIG. 12B-3

Mainboard - Data Bus Speed (Mandatory / Single Value)
   N/A | 100 | 16 | 33 | 50 | 60 | 66 | 75 | 83 |
   ------------------------------------------------------------------------
   Hz | KHz | MHz | GHz |

Mainboard - Chipset Type / Vendor (Optional / Single Value)
   N/A | ALi Aladdin IV | ALi Aladdin V | Intel 430FX (Trition) | Intel 430HX (Trition II) | Intel 430LX (Mercury) | Intel 430MX (Mobile Trition) | Intel 430NX (Neptune) | Intel 430TX | Intel 430VX (Trition III) | Intel 440BX | Intel 440EX | Intel 440LX | SiS 5571 | SiS 5591 | SiS 5597/5598 | VIA MVP3 | VIA VP1 | VIA VP2/97 | VIA VP3 | VIA VPX/97 | VIA VXPro |

Mainboard - BIOS Type / Vendor (Optional / Single Value)
   N/A | AMI | Award | Phoenix |

Memory / Cache - Type (Mandatory / Single Value)
   N/A | None | DRAM | EROM | Flash | L2 Cache | ROM | SRAM |

Memory / Cache - Form Factor (Optional / Single Value)
   N/A | DIMM 100-PIN | DIMM 168-PIN | Proprietary | SIMM 30-PIN | SIMM 72-PIN | SO DIMM 144-PIN | SO DIMM 72-PIN | SO DIMM 84-PIN |

FIG. 13A-1

Proof Data Sheet

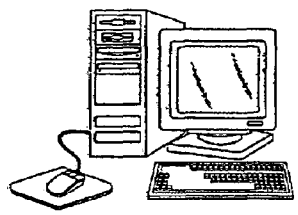

Data Language  French ~1300
Vendor         IBM ~1302
Vendor SKU     37E74FR ~1304
Quantity       1 ~1306
GDT SKU        S0000654 ~1308

Standardized Description ~1310

Aptiva E MT 1 x K6 MMX 300 - Niveau 2 256 Ko - Memoire Vive 48 Mo - DD 4.2 Go - CD 24x - Mdm 56.6 Kbps - Microsoft Windows 95 - Moniteur 15"

Marketing Description ~1312

Puissance surprenante a un prix tres abordable - Le meilleur de la micro avec puissance, performance et de remarquables capacites multimedia a un prix abordable.
De plus la Suite Bureautique Lotus Smartsuite comprenant Lotus WordPro pour le traitement de texte, Lotus 1-2-3 pour les tableurs, Lotus FreeLance Graphics pour les presentations sont inclus.

Capacite d'extension - Il croit avec vous. La serie E vous offre une capacite de croissance unique dans cette gamme de prix. 2 ports USB pour un "plug and play" facile ainsi que 5 slots et 2 baies disponibles.

Un support technique prime - Le choix des lecteurs "PC Magazine" pour le service et le support. Faites le choix de confiance avec IBM Aptiva.

Extended Description ~1314

| 1  | Format (LxPxH) / Poids           | Minitour 19.5 cm x 45.5 cm x 42.9 cm / 12.7 kg |
|----|----------------------------------|------------------------------------------------|
| 2  | Processeur                       | 1 x AMD K6 MMX 300 MHz                         |
| 3  | Memoire Cache Installe(e) (Max)  | 256 Ko (256 Ko) Cache de Niveau 2              |
| 4  | Memoire Vive Installe(e) (Max)   | 48 Mo (256 Mo) SDRAM DIMM 168 broches          |
| 5  | Lecteur de Disquette             | 1x 1.44 Mo 3.5" HD interne                     |
| 6  | Lecteur de Disque Dur            | 1 X 4.2 Go interne                             |
| 7  | Stockage CD / DVD                | 1 X 650 Mo CD-ROM 24x interne                  |
| 8  | Stockage Amovible                | Aucun(e)                                       |
| 9  | Amovible de Stockage (2eme)      | Aucun(e)                                       |
| 10 | Affichage                        | 15" tube cathodique conventionnel 24-bit couleur bureau |
| 11 | Sortie Video                     | Carte Graphique ATI Rage II+ 2 MB (2 MD) SGRAM |
| 12 | Sortie Audio                     | Carte son 16-Bit 44.1 KHz son 3D               |
| 13 | Telecommunications               |                                                |
| 14 | Reseaux                          | Aucun(e)                                       |
| 15 | Alimentation                     | 115/220 V (50/60 Hz)                           |
| 16 | Systeme d'Exploitation           | Microsoft Windows 95                           |
| 17 | Garantie                         | 1 annee de garantie                            |

FIG. 13A-2

| Technical Specifications ~1316 | |
|---|---|
| 1 General | |
| 2 Format Systeme | Minitour |
| 3 Dimensions (LxPxH) / Poids | 19.5 cm x 45.5 cm x 42.9 cm / 12.7 kg |
| 4 Couleur Boitier | Blanc |
| 5 Processeur | |
| 6 Processeur Installe (Max) | 1 (1) x AMD K6 MMX 300 MHz |
| 7 Bus Systeme Principal | 66 MHz |
| 8 Memoire | |
| 9 Memoire Cach Installe(e) (Max) | 256 Ko (256 Ko) Cache de Niveau 2 - Write-Back Cache |
| 10 Memoire Vive Installe(e) (Max) | 48 Mo (256 Mo) DRAM - SDRAM DIMM 168 broches |

FIG. 13A-3

| | | |
|---|---|---|
| 11 | *Stockage* | |
| 12 | Lecteur de Disquette | 1 x 1.44 Mo 3.5" HD interne |
| 13 | Lecteur de Disque Dur | 1 x 4.2 Go interne |
| 14 | Stockage CD / DVD | 1 x 650 Mo CD-ROM 24x interne CD-DA, CD-XA, Kodak PhotoCD |
| 15 | Stockage Amovible | Aucun(e) |
| 16 | Amovible de Stockage (2eme) | Aucun(e) |
| 17 | Controleur de Stockage | IDE / EIDE integre |
| 18 | Controleur de Stockage (2eme) | Aucun(e) |
| 19 | *Affichage* | |
| 20 | Affichage Type | tube cathodique 15" conventionnel |
| 21 | Resolution Max | 24-bit couleur / 1024 x 768 multiscan |
| 22 | *Video* | |
| 23 | Sortie Video | Carte Graphique ATI Rage II+ integre |
| 24 | Memoire / Video Installe (Max) | 2 Mo (2 Mo) SGRAM |
| 25 | Resolution Max (externe) | 16-bit couleur / 1024 X 768 |
| 26 | Video Supportee | RGB |
| 27 | Entree Video | Aucun(e) |
| 28 | Video Suportee | |
| 29 | *Audio* | |
| 30 | Sortie Audio | Carte son integre(e) AdLib, Sound Blaster, Sound Blaster 16/Pro, Microsoft WSS 1.0/2.0, MPU-401 |
| 31 | Mode Sortie Son | 16-Bit 44.1 KHz son 3D |
| 32 | Entree Audio | Microphone externe |
| 33 | *Telecommunications / Reseaux* | |
| 34 | Modem / Comm. | Fax / modem interne K56Flex DSVD jeu de commandes AT Hayes |
| 35 | Debit de Transfert Max (Fax) | 56.6 Kbps (14.4 Kbps) |
| 36 | Reseau | Aucun(e) |
| 37 | Protocole de Gestion a Distance | |
| 38 | *Extension(s) / Connectivite* | |
| 39 | Baie(s) d'Extension Total (Libre) | 1 (0) x interne 3.5" | 1 (0) x accessible de front 3.5" | 3 (2) x accessible de front 5.25" |
| 40 | Logement(s) d'extensionTotal (Libre) | 1 (1) x Partage PCI / ISA pleine-longueur | 3 (2) x ISA pleine-longueur | 2 (2) x PCI pleine-longueur |
| 41 | Port(s) Total (Libre) / Type de Connecteur | 1 (1) x modem ligne de sortie / RJ-11 femelle | 1 (1) x modem ligne d'entree / RJ-11 femelle | 1 (0) x audio ligne de sortie / Prise Mini-Phono Stereo 3.5 mm femelle | 1 (1) x audio ligne d'entree / Prise Mini-Phono Stereo 3.5 mm femelle | 1 (0) x microphone Entree / Prise Mini-Phono Stereo 3.5 mm femelle | 1 (1) x Gameport / MIDI generique / 15 broches D-Sub (DB-15) femelle | 1 (0) x affichage / video VGA / VBE / 15 broches D-Sub (DB-15) femelle | 1 (0) x souris generique / 6 broches mini-DIN (Style PS/2) femelle | 1 (0) x clavier generique / 6 broches mini-DIN (Style PS/2) femelle | 2 (2) X serie USB / prise 4 broches USB femelle | 1 (1) x serie RD-232 / 9 broches D-Dub (DB-9) male | 1 (1) x parallele IEEE 1284 (EPP/ECP) / 25 broches D-Sub (DB-25) femelle |

FIG. 13A-4

| | | |
|---|---|---|
| 42 | Cable(s) / Peripherique(s) | |
| 43 | Type de Peripherique d'Entree | Clavier, souris |
| 44 | Divers | |
| 45 | Normes | Plug and play |
| 46 | Dispositifs de Securite | |
| 47 | Caracteristiques d'Environnement | 10 °C / 35 °C / 20 -80% |
| 48 | Alimentation | |
| 49 | Type de Peripherique | Alimentation interne |
| 50 | Tension Requise | 115/220 V ± 10% (50/60 Hz) |
| 51 | Consommation en Fonctionnement | 200 Watts |
| 52 | Systeme d'exploitation / Lociciel | |
| 53 | Systeme d'Exploitation Fourni | Microsoft Windows 95 preinstalle |
| 54 | Logiciel(s) Inclu(s) | Lotus SmartSuite, support & utilitaires |
| 55 | Garantie | |
| 56 | Service / Maintenance | 1 annee de garantie |
| 57 | Service / Details de la maintenance | 1 an x garantie limitee Retour Atelier |

FIG. 13B-1

Desktop / Deskside —1318
Technical Specifications —1320

| |General| —1322 | |
|---|---|
| |Product Form Factor( )| —1324 | |Form Factor (V)| —1326 |
| |Dimensions|(WxDxH)|/|Weight| | |Dimensions / Weight - Width (V)|Dimensions / Weight - Width (U)|x(LR)|Dimensions / Weight - Depth (V)|Dimensions / Weight - Depth (U)|x(LR)|Dimensions / Weight - Height (V)|Dimensions / Weight - Height (U)|/(LR) |Dimensions / Weight - Weight (V)|Dimensions / Weight - Weight (U)| |
| |Enclosure Color ( )| | |Miscelleneous - Color (V)| |
| |Processor (N)| | |
| |Processor (N)|Installed|(|Max|)| | |Processor - Installed Qty (V)|((R)|Processor - Max Supported Qty (V)|(L)|x(R)|Processor - Manufacturer (V)|Processor - Type (V)|Processor - Clock Speed (V)|Processor - Clock Speed (U)| |
| |Data Bus Speed (N)| | |Mainboard - Data Bus Speed (V)|Mainboard - Data Bus Speed (U)|Mainboard - Chipset Type / Vendor (V)|Mainboard - BIOS Type / Vendor (V)| |
| |Memory| | |
| |Memory / Cache (N)|Installed|(|Max|)| | |Memory / Cache - Installed Size (V)|Memory / Cache - Installed Size (U)|((R)|Memory / Cache - Max Supported Size (V)|Memory / Cache - Max Supported Size (U)|(L)|Memory / Cache - Type (V)|-()|Memory / Cache - Technology (V)| |
| |Memory / RAM (N)|Installed|(|Max|)| | |Memory / RAM - Installed Size (V)|Memory / RAM - Installed Size (U)|((R)|Memory / RAM - Max Supported Size (V)|Memory / RAM - Max Supported Size (U)|(L)|Memory / RAM - Type (V)|-()|Memory / RAM - Technology (V)|Memory / RAM - Form Factor (V)| |
| |Storage| | |
| |Storage Floppy Drive (N)| | |Storage Floppy Drive - Installed Qty (V)|x(LR)|Storage Floppy Drive - Formatted Capacity (V)|Storage Floppy Drive - Formatted Capacity (U)|Storage Floppy Drive - Type (V)|Storage Floppy Drive - Form Factor (V)| |
| |Storage Hard Drive (N)| | |Storage Hard Drive - Installed Qty (V)|x(LR)|Storage Hard Drive - Formatted Capacity (V)|Storage Hard Drive - Formatted Capacity (U)|Storage Hard Drive - Form Factor (V)|Storage Hard Drive - Compliant Standards (V)| |
| |Storage CD / DVD (N)| | |Storage CD / DVD - Installed Qty (V)|x(LR)|Storage CD / DVD - Formatted Capacity (V)|Storage CD / DVD - Formatted Capacity (U)|Storage CD / DVD - Type (V)|Storage CD / DVD - CD / DVD Read Speed (V)|Storage CD / DVD - Form Factor (V)|Storage CD / DVD - Compliant Standards (V)| |
| |Storage Removable (N)| | |Storage Removable - Installed Qty (V)|x(LR)|Storage Removable - Native Capacity (V)|Storage Removable - Native Capacity (U)|Storage Removable - Type (V)|Storage Removable - Form Factor (V)|Storage Removable - Compliant Standards (V)| |
| |Storage Removable (2nd) (N)| | |Storage Removable (2nd) - Installed Qty (V)|x(LR)|Storage Removable (2nd) - Native Capacity (V)|Storage Removable (2nd) - Native Capacity (U)|Storage Removable (2nd) - Type (V)|Storage Removable (2nd) - Form Factor (V)|Storage Removable (2nd) - Compliant Standards (V)| |

FIG. 13B-2

| |Storage Controller (N)| | |Storage Controller (2nd) - Installed Qty (V)|Lx(LR)|Storage Controller - Type (V)|Storage Controller - Form Factor (V)|Storage Controller - RAID Level (V)| |
|---|---|
| |Storage Controller (2nd) (N)| | |Storage Controller (2nd) - Installed Qty (V)|Lx(LR)|Storage Controller (2nd)- Type (V)|Storage Controller (2nd)- Form Factor (V)|Storage Controller (2nd)- RAID Level (V)| |
| |Display| | |

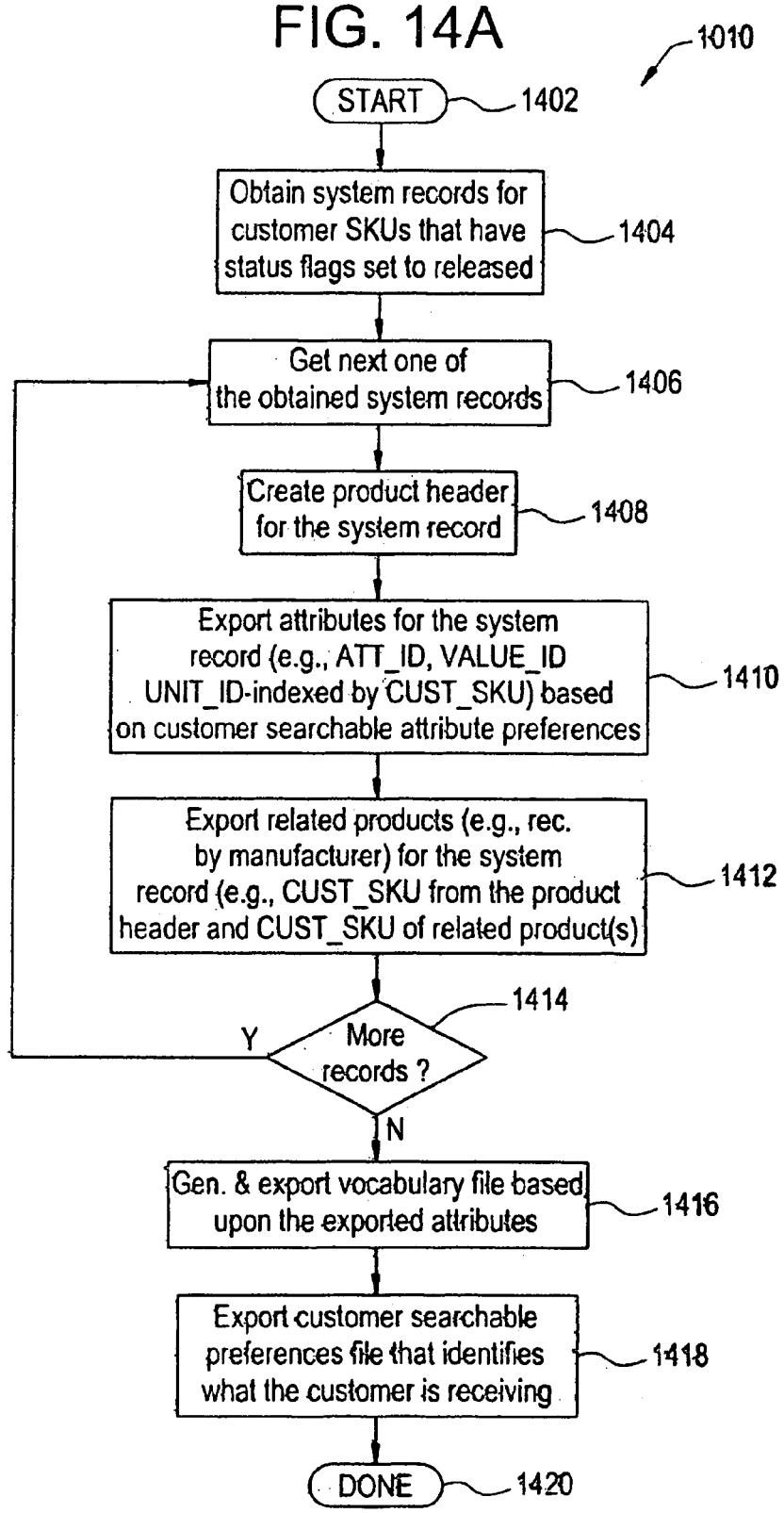

Connection architecture

FIG. 15C

CATEGORY ~1526

SELECTED ATTRIBUTES ~1528

- ☒ ATTRIBUTE 1
- ☐ ATTRIBUTE 2
- ☒ ATTRIBUTE 3
- ☐ ATTRIBUTE 4
- ☒ ATTRIBUTE 5
- ☐ ATTRIBUTE 6
- ☒ ATTRIBUTE 7

SELECTED PRODUCTS ~1530

- ☐ PRODUCT 1
- ☒ PRODUCT 2
- ☐ PRODUCT 3
- ☒ PRODUCT 4
- ☐ PRODUCT 5
- ☒ PRODUCT 6
- ☐ PRODUCT 7
- ☐ PRODUCT 8

PRODUCT 2

1532 {
- ATTRIBUTE 1
- ATTRIBUTE 3
- ATTRIBUTE 5
- ATTRIBUTE 7

PRODUCT 4

- ATTRIBUTE 1
- ATTRIBUTE 3
- ATTRIBUTE 5
- ATTRIBUTE 7

PRODUCT 6

- ATTRIBUTE 1
- ATTRIBUTE 3
- ATTRIBUTE 5
- ATTRIBUTE 7

METHODS OF CAPTURING CATALOG DATA

CROSS-REFERENCE TO RELATED APPLICATION

This application is related to U.S. application Ser. No. 09/626,347 filed on the same day, and entitled "METHODS AND APPARATUS FOR CATALOG DATA CAPTURE, STORAGE, AND DISTRIBUTION", U.S. application Ser. No. 09/625,913 filed on the same day, and entitled "METHODS OF CATALOG DATA MAINTENANCE, STORAGE, AND DISTRIBUTION", and U.S. application Ser. No. 09/626,090 filed on the same day, and entitled "METHODS AND APPARATUS FOR IMPLEMENTING A MULTI-LINGUAL CATALOG SYSTEM".

BACKGROUND OF THE INVENTION

1. Field of the Invention

The present invention relates to methods and apparatus for capturing, storing, and distributing product data. More particularly, the present invention relates to capturing, storing, and distributing data suitable for use in electronic catalogs.

2. Description of the Related Art

Manufacturers and suppliers of products have traditionally distributed paper catalogs to market their products to resellers and consumers. However, such traditional marketing tools are costly. In addition to the cost of the materials with which each catalog is manufactured, postage is required to mail each catalog to a potential purchaser. Moreover, the potential market base of traditional catalogs is limited by the mailing list maintained by the individual manufacturer or reseller. With the advent and increasing popularity of the Internet, suppliers have access to a much larger potential customer base. Through the Internet, the market base of manufacturers and resellers may be maximized while the associated overhead may potentially be dramatically reduced. As a result, providing catalogs to end-users in electronic form through the Internet has started to become a viable alternative or addition to traditional print catalogs. However, for electronic commerce to be successful, product information must be made available in an accurate and efficient manner to enable consumers to make well-informed purchase decisions.

Current electronic catalogs are typically little more than electronic versions of print catalogs. Although such electronic catalogs are useful and have been growing in popularity, they don't tend to deliver significantly more product information than print catalogs. Thus, they don't take advantage of one of the biggest potential advantage that electronic catalogs have over print catalogs. That is, the ability to deliver significantly more product information than their cousins the print catalogs. This is unfortunate since consumer purchase decisions are guided in large part by the product information that is readily accessible to the consumer. One reason that current electronic catalogs typically offer little more product information than print catalogs is that most resellers consider it prohibitively expensive to gather extensive product information and then make such information available in electronic form. However, due to the vast amount of information available on the Internet in recent years, consumer expectations have increased dramatically. Therefore electronic retailers that are able to provide more product information and a better ability for consumers to compare products will have a competitive advantage.

In a traditional chain of transactions, a manufacturer sells its products to a distributor for distribution to resellers who then sell the products directly to consumers. Although manufacturers have access to the most detailed information regarding products that they sell to distributors, the information that is ultimately accessible by potential end-users is often limited. Moreover, manufacturers, distributors and resellers often publish data with varying levels of detail to describe features of the same product. For instance, a reseller may simply advertise the availability of a particular computer at an advertised cost while another reseller or a distributor may provide specific details regarding the same computer such as the type and number of ports included. In addition to the varying content of the information supplied by different sources, the information is often structured very differently. The lack of standardization regarding the content and structure of product information will become evident with the examination of any advertisement or web site. Due to the lack of localized, structured information, it is often difficult to compare competitive products.

More specifically, in order to compare similar products that are available from different manufacturers, a consumer typically must perform lengthy searches. As a result, it is a time-consuming and difficult process for a consumer to access the same information for a variety of products, particularly when the products are not available from the same manufacturer. Therefore, electronic retailers that are able to provide more consumers with a better ability to compare similar products from different manufactures will have a competitive advantage.

One more problem encountered by both print and electronic catalogs is that the product information they do have is often inaccurate and/or out of date. In order to acquire accurate and detailed information for use in catalogs, product information is often obtained from the manufacturer or reseller of the product. For instance, a standard product description in which standard features of the product are described is often supplied by the product manufacturer. However, in today's technologically fast paced environment, manufacturers are continually upgrading product features as well as corresponding product descriptions. With these frequent technological advances there is a high probability that catalogs produced by resellers will contain outdated information. Accordingly, it would be desirable if an up-to-date product description were made available to suppliers and resellers to ensure the accuracy and completeness of such catalog entries.

Still another limitation of most catalogs is that they are not multi-lingual. That is, most catalogs are written in one language and are really only suitable for use by customers comfortable using that particular language. Typically, it takes a significant amount of time and energy to write a catalog for use in a second language, thus the few catalogs that are multi-lingual tend to provide very limited product information. The lack of detailed multi-lingual catalog product occurs even when the manufacturer has provided detailed multi-lingual product information. The difficulty in creating information rich multi-lingual catalogs has proven to be a significant deterrent to selling across borders, particularly in places like Europe where there are a number of languages used in a small geographic area.

In view of the foregoing, improved mechanisms for gathering, organizing and delivering product information to catalog creators would be highly desirable. Further, the ability to deliver such information in a multi-lingual form to create multi-lingual catalogs would be an additional benefit.

Additionally, improved mechanisms for enabling product comparison and/or delivering would be desirable.

SUMMARY OF THE INVENTION

The present invention enables product data to be captured, stored and distributed in an efficient manner. This is accomplished, in part, through the use of a product data model that is used to facilitate the capture and storage of the product data. In this manner, product data suitable for use in electronic catalogs is captured and stored for subsequent distribution to customers (e.g., manufacturers, distributors, resellers) as well as end-users.

According to one aspect of the invention, a data structure suitable for use in collecting, distributing or storing product data for use in a catalog is disclosed. More particularly, the data structure is based on a data model having one or more classes, where each of the classes has one or more associated categories. The data structure includes at least one class definition, each class definition being arranged to identify one or more associated categories. In addition, the data structure includes a plurality of category definitions, each category definition being arranged to identify an associated attribute group. The data structure further includes a plurality of attribute group definitions, where each attribute group definition is arranged to identify one or more attributes that are associated with the attribute group. In order to assist in the capture of data, each attribute has an associated possible value list that identifies values that are selectable as values for the associated attribute. Accordingly, product data may be captured and stored according to the data model. As a result, detailed product information may be gathered and concentrated in one location for subsequent distribution.

There are a variety of methods for capturing data according to the data model as well as numerous types of data that may be captured for a particular product. According to one aspect of the invention, a customer product portfolio file is received. For instance the customer product portfolio file may identify products for which a customer requests that data be captured. The customer product portfolio file is then mapped to a system product data file such that each product that is not in the system product data file is identified. Data is then captured for each product that is not in the system product data file. The captured data is then added to the system product data file.

According to one embodiment, a method of capturing data includes classifying a product according to the data model. At least one of the values in the associated possible value list are then selected for selected attributes in the associated attribute group. The selected values for the product are then input to the system product data file. In addition, other data such as product images may be captured and stored for subsequent distribution.

Upon completion of the data capture, the data may be made available on the Internet for viewing and searches. In addition, the data may be packaged and distributed according to the needs of the customers requesting the data. For instance, enriched product data may be generated from the system product data file according to a customer profile. According to one embodiment, the customer profile identifies at least one customer as well as customer searchable attribute preferences corresponding to each customer. For instance, the customer searchable attribute preferences may specify attributes (e.g., speed, size) for which values are to be transmitted. Once the values are transmitted to the customer, the values may be obtained via a search engine to enable an end-user to compare selected attributes among selected products. For instance, the category "Desktop" may be selected along with selected products (e.g., printers) and selected attributes (e.g., memory speed).

In addition to exporting attributes and associated values, other data may be exported. This data may include, for example, a marketing description, product images, or technical specifications associated with a product. Moreover, information that identifies related (e.g., compatible) products may be compiled for distribution. In addition, a vocabulary file associated with exported attributes and associated values may be generated to enable data to be captured, stored, and distributed in multiple languages.

Once the customer receives the requested data, the customer may use the data in a variety of marketing schemes. For instance, the data may be stored for use with a customized search engine, the data may be printed in a traditional catalog, or the data may be supplied in an electronic catalog. In this manner, a customer (i.e., retailer) may customize data that is ultimately made available to end-users.

Since all products and associated data are classified according to the data model, search engines may easily be customized according to the needs of the manufacturer, distributor, reseller, or consumer. As a result, browsing and searching for product data by an end-user is simplified. For instance, an end-user wishing to find products according to specific criteria such as price or processor speed may easily locate and compare multiple products. As a result, in contrast with previously available catalog systems, the shopping experience is ultimately determined by the consumer. Accordingly, through the use of the present invention, the bargaining power may be shifted from the manufacturer to the consumer.

These and other features of the present invention will be described in more detail below in the detailed description of the invention and in conjunction with the following figures.

BRIEF DESCRIPTION OF THE DRAWINGS

FIG. 3 is a diagram illustrating exemplary categories that may be applied to categorize classes within a computer system according to an embodiment of the invention.

FIG. 4 is a diagram illustrating exemplary attribute groups that may be used to define a given category in a computer system according to an embodiment of the invention.

FIG. 8C illustrates exemplary data structures that may be used to store attributes in the product data according to an embodiment of the invention.

FIG. 10A is a flow diagram illustrating a method of catalog maintenance according to an embodiment of the invention.

FIG. 10B is an exemplary product portfolio file received in step 1002 of FIG. 10A according to an embodiment of the invention.

FIG. 11 is a flow diagram illustrating a method of mapping customer data to system data as shown in step 1004 of FIG. 10A according to an embodiment of the invention.

FIG. 12B illustrates an exemplary product data research form that may be used to capture product data as shown in FIG. 12A according to an embodiment of the invention.

FIG. 13A is a proof data sheet illustrating exemplary components that may be generated for use in catalogs according to an embodiment of the invention.

FIG. 13B is a component generator report illustrating exemplary component definitions for creating specified components according to an embodiment of the invention.

FIG. 14A. *is* a flow diagram illustrating a method of generating enriched product data as shown in step 1010 of FIG. 10A according to an embodiment of the invention.

FIG. 15C is a diagram illustrating a comparison of selected products according to selected comparable attributes according to an embodiment of the invention.

DETAILED DESCRIPTION OF THE INVENTION

Figure 1:
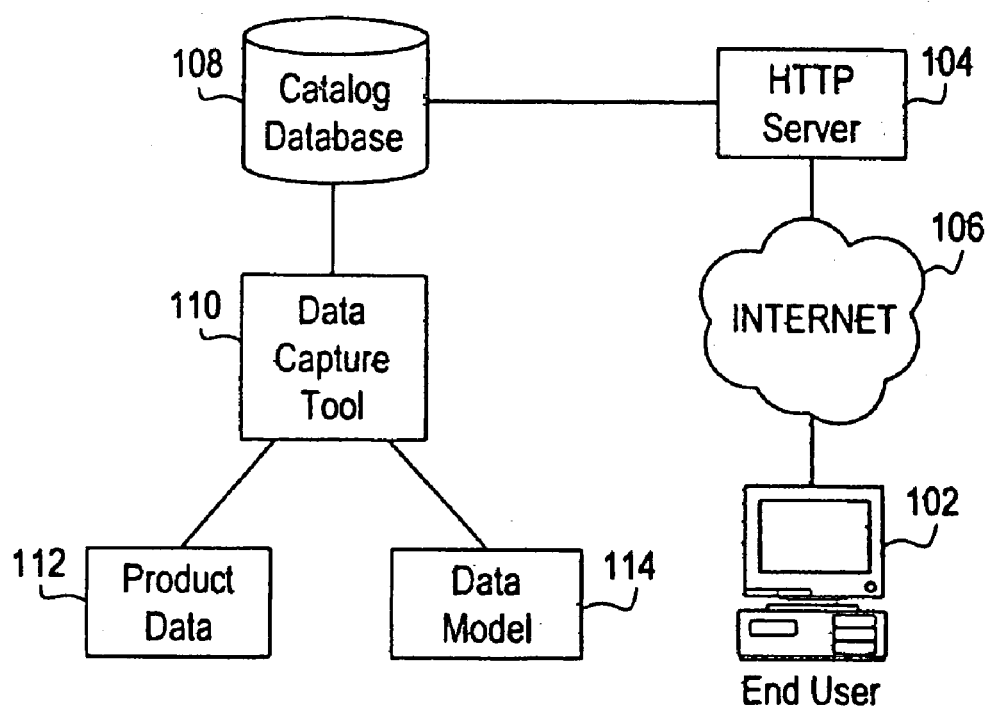
FIG. 1 is a diagram illustrating a system in which the present invention may be implemented.

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

An invention is described herein that enables catalog data to be captured, stored, and distributed in an efficient manner through the use of a data model. Prior to the capture of catalog data for particular products, each product is initially classified according to the data model. The data model may be developed in a wide variety of ways to meet the needs of a specific application. One approach is to specifically design the data model to classify products within a particular industry. By way of example, the data model may include a hierarchical data structure including one or more classes in which each product may be classified. Moreover, each class may be further divided into categories. Using the example of the computer industry, the classes may include Input Devices, Output Devices, Data Storage Devices, Software, etc, and the class "Output Devices" may include the categories Desktop Monitor, Printers, Audio, Output Cable, etc. Although a data model for a computer system will be described in further detail below, the data model is merely illustrative and may be tailored for any given industry.

In addition to the classification system, the data model defines attributes for each of the classification categories. In effect, the attributes identify the type of data which is to be captured for each product within a particular category. One or more attributes (e.g., size, upgradability) may be specified for each category within the data model. By way of example, the attributes associated with each category may be arranged in one or more attribute groups.

After a product is classified, product data may be captured using the data model. To simplify data capture, potential values may be associated with some or all of the attributes. By way of example, the potential values for each attribute associated with the product category may be rendered for selection during data capture. Upon selection, these attribute values may be input as product data. In addition, units associated with these values may similarly be rendered, selected, and input as product data. Through the identification of the attribute values and/or units, the data model may be tailored for any given industry and used to simplify the data capturing process.

Upon completion of the capturing process, the product data may be stored and linked to the data model to permit efficient and accurate retrieval of the product data. The product data and associated information from the data model may be transmitted on a regular basis to the customer or upon request (e.g., catalog query). In addition, the catalog data may be distributed in its entirety or in portions (e.g., components). In this manner, the content and format of the product data transmitted to the customer may be tailored to the customer's individual marketing needs. Once received by the customer, the product data may be made available to end users through a catalog such as a traditional catalog or an online catalog. In the following figures and related descriptions, more detailed methods and apparatus for capturing, storing, and transmitting the catalog data are set forth.

FIG. 1 is a diagram illustrating a system in which the present invention may be implemented. As shown, an end user 102 may connect to an HTTP server 104 via the Internet 106 to access a catalog database 108. As described above, a manufacturer or retailer may wish to market various products via the Internet through such an online catalog. Since it would be desirable if the data in the catalog database 108 remained current, it would be preferable if updated catalog data could be transmitted and stored in the catalog database 108. In order to provide such updated catalog data, a data capture tool 110 may be used to capture product data 112 according to a data model 114. An exemplary data model will be described in further detail below with reference to the following figures.

Figure 2:
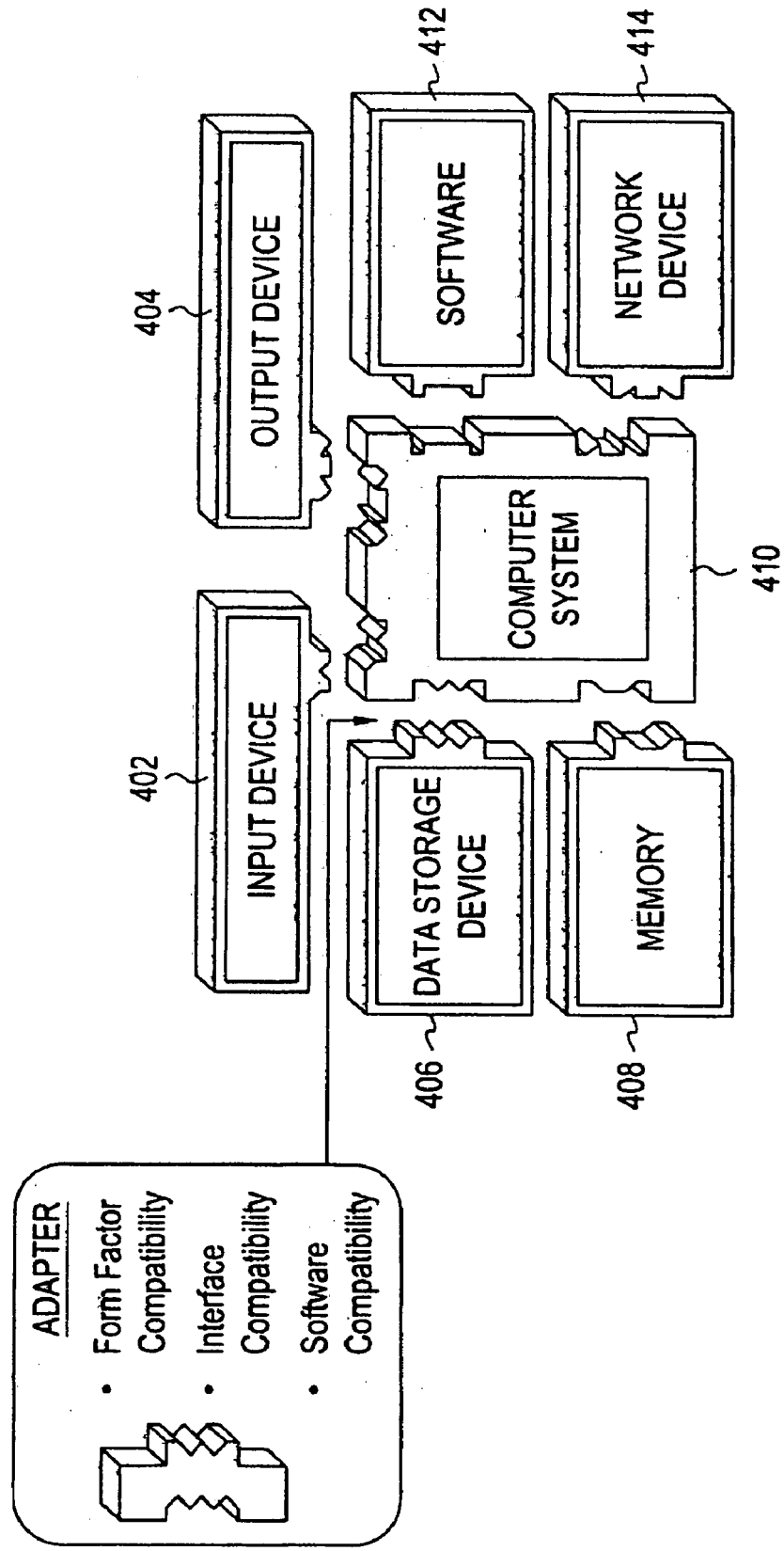
FIG. 2 is diagram illustrating exemplary classes that may be applied to classify a computer system according to an embodiment of the invention.

As described above, a hierarchical data model may be used to capture, store, and distribute data in an accurate and time effective manner. By way of example, at the highest level of the data model, the data model may be divided into one or more classes in which a product may be classified. FIG. 2 is diagram illustrating exemplary classes that may be applied to classify a computer-related product according to an embodiment of the invention. As shown, exemplary classes that may be used to classify a computer-related product include input devices 402, output devices 404, data storage devices 406, memory 408, computer systems 410, software 412, and network devices 414. Although seven classes are listed, those of ordinary skill in the art will readily recognize that greater or fewer classes may be used to appropriately classify a computer system or other product.

Within each class of the data model, one or more categories may be defined. FIG. 3 is a diagram illustrating exemplary categories that may be applied to categorize classes within a computer system according to an embodiment of the invention. As shown, each class 500 may be further defined by one or more categories 504. By way of example, the class "Systems" 502 may include the categories desktop 504, laptop 506, handheld 508, CPU Upgrade 510, mainboard 512, cabinet 514, UPS & Power 516, battery 518, docking & connectivity 520, portable accessory 522, and service & support 524. In addition, the classes memory 504, storage 506, input 508, output 510, network 512, and software 514 are shown to include multiple categories. Those of ordinary skill in the art will readily recognize that these categories are merely exemplary, and a different number or type of categories may be used to further define each class.

Each category of the data model may be further divided into attribute groups. FIG. 4 is a diagram illustrating exemplary attribute groups that may be used to define a given category in a computer system according to an embodiment of the invention. As shown, each category 602 may include one or more attribute groups 604. In addition, each of these attribute groups 604 may include one or more attributes 606 for which values may be captured. As shown, the category "Desktop" 608 is shown to include multiple attribute groups 604, each of which include a plurality of attributes 606. By way of example, the attribute group "System" 610 is shown to include attributes "Type" 612 and "Designation" 614. As yet another example, attribute group "Processor" 616 may include attributes such as "Upgradability" 618 and "Clock Speed" 620. Those of ordinary skill in the art will readily recognize that each specific category may be defined by greater or fewer attributes as necessary to properly define the corresponding category.

For each attribute, a multi-value indicator 622 may indicate whether multiple values may be captured for a single attribute. In other words, the multi-value indicator 622 may indicate that more than one of the values in an associated possible value list are selectable. As one example, within the category "Desktop" and the attribute group, "Processor," the attribute "Clock Speed" may have an associated value list including 100, 200, 300, etc. Similarly, the attribute "Clock Speed" may have an associated possible unit list "Hz, KHz, MHz, GHz." Thus, for each processor speed in which the product is available, a value may be selected from the value list. Similarly, for each value selected from the possible value list, an associated unit may be selected from the associated possible unit list. As another example, the attribute "Architecture Features" 622 may have an associated value list including "100 MHz front side bus, dynamic execution, and MMX instruction set. Thus, for each architecture feature of the processor of the current product, a value may be selected from the value list. Accordingly, attributes with which the product is available may be represented.

In addition, a data capture priority 626 may be assigned to each attribute which indicates a priority of data capture. By way of example, as shown, a priority of "1" may be assigned to those attributes which are to be captured first while a priority of "2" may be assigned to those attributes which are of secondary importance. Of course, any number of levels of importance may be utilized. The attributes may also optionally be designated as "searchable" 624 by a system designer or administrator. Searchable attributes are attributes that are potentially available to be electronically searched on in electronic versions of the catalog. Since values associated with the searchable attributes must ultimately be searchable by an electronic catalog user, it may be desirable to emphasize or prioritize the capture of these attributes. For example, the searchable attributes may be assigned a priority of "1," as shown.

Figure 5:
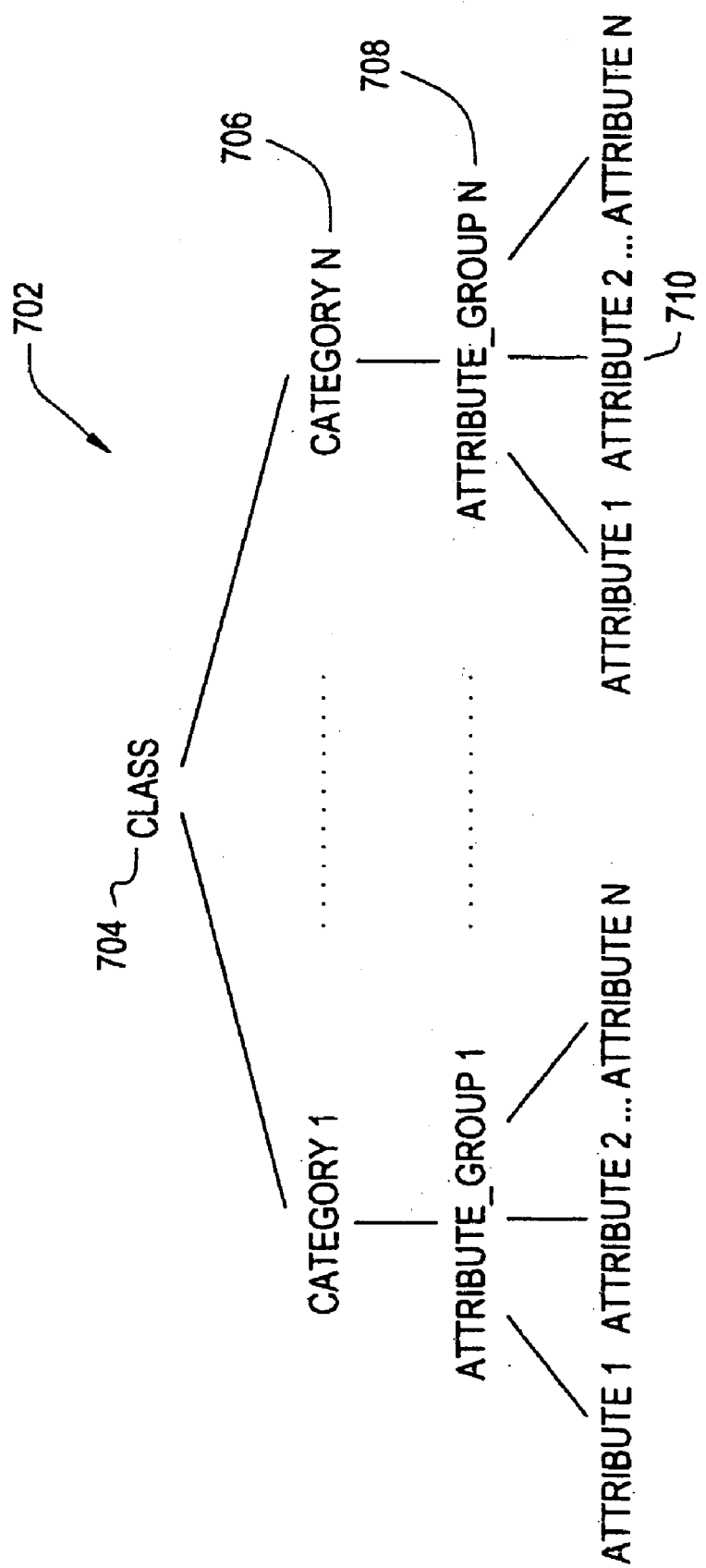
FIG. 5 is a diagram illustrating a hierarchical data model that may be used to capture catalog data according to an embodiment of the invention.

As illustrated and described above, the data model may include various classes, categories, attribute groups, and attributes such as those illustrated in FIGS. 2-4. FIG. 5 is a diagram illustrating a hierarchical data model including classes, categories, attribute groups, and attributes according to an embodiment of the invention. As shown, the data model 702 includes one or more classes 704. Each of the classes 704 may be defined by one or more categories 706. Each category 706 may be further defined by one or more attribute groups 708, each of which include one or more attributes 710 for which values and corresponding units may be captured. Accordingly, the data model may be applied during the data capturing process.

Figure 6:
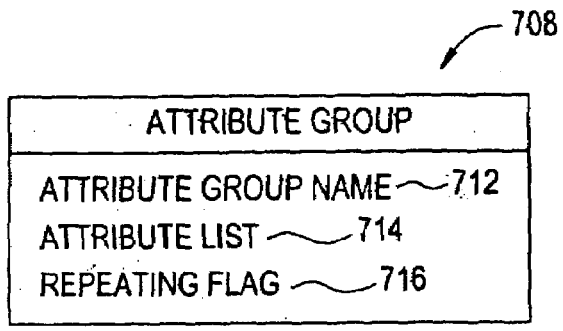
FIG. 6 is a diagram illustrating an exemplary data structure that may be used to store an attribute group in the hierarchical data model of FIG. 5 according to an embodiment of the invention.

During data capture, values and units may be captured and input for selected attributes in an attribute group. FIG. 6 is a diagram illustrating an exemplary data structure that may be used to store an attribute group in the hierarchical data model of FIG. 5 according to an embodiment of the invention. As shown, each attribute group 708 includes an attribute group identifier, or attribute group name 712. In addition, the attribute group 708 includes an attribute list 714 including one or more attributes.

Since a particular feature may be repeating, a corresponding attribute group may similarly be repeating. Thus, an attribute group 708 may further include a repeating indicator 716 (e.g., flag) which indicates that the attribute group is a "repeating group" in the data model when the repeating indicator 716 is in a predefined state. In other words, the listing of potential values for the attribute group may be provided or displayed multiple times as a prompt for user input during the data capturing process.

Figure 7:
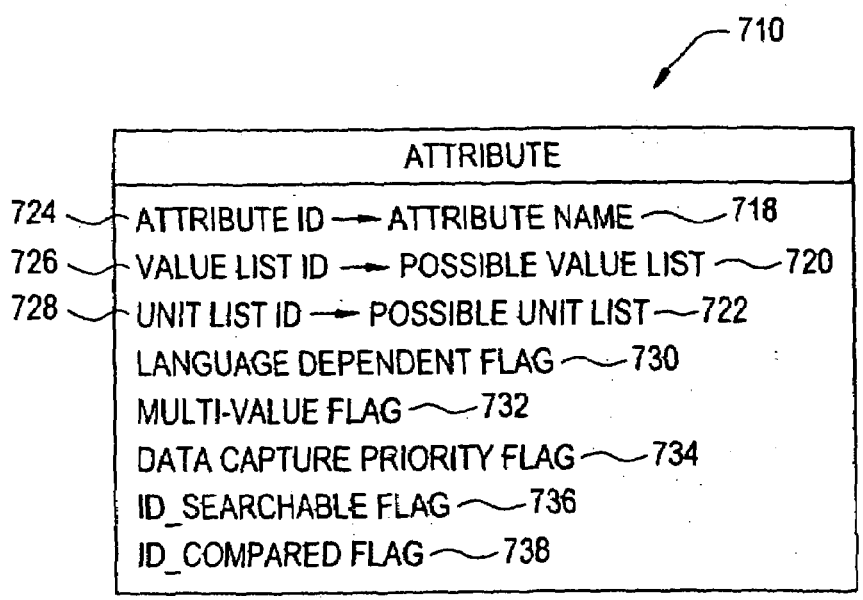
FIG. 7 is a diagram illustrating an exemplary data structure that may be used to store an attribute in the hierarchical data model of FIG. 5 according to an embodiment of the invention.

As shown in FIG. 6, each attribute group includes an attribute list that identifies one or more attributes that are associated with the attribute group. FIG. 7 is a diagram illustrating an exemplary data structure that may be used to store an attribute in the hierarchical data model of FIG. 5 according to an embodiment of the invention. As shown, each attribute 710 is identified by an attribute name 718 and is associated with a possible value list 720 that identifies values that are selectable as values for the associated attribute. In addition, each attribute 710 may be associated with a possible unit list 722 that identifies units that are selectable as units for the associated attribute. As shown, the attribute name 718 is associated with an attribute ID 724 (e.g., integer). Similarly, the possible value list 720 is associated with a value list ID 726 (e.g., alphanumeric value), and the possible unit list 722 is associated with a unit list ID 728 (e.g., alphanumeric value). In addition, each of the attributes is associated with a language dependent indicator 730 that indicates availability of a translation of record data associated with the corresponding attribute when the language dependent indicator 730 is in a predefined state. Each attribute is further associated with a multi-value indicator 732 that indicates that more than one of the values in the associated possible value list 722 are selectable when the multi-value indicator 732 is in a predefined state. In addition, a data capture priority indicator 734 assigns priorities to at least some of the attributes in order that these attributes are prioritized for capture. By way of example, a system administrator may indicate that selected attributes be captured by a particular date. In addition, such prioritization may be uniquely defined for each category associated with the prioritized attributes.

As described above, a system designer or administrator may prefer that selected attributes be captured while others be only optionally captured. Thus, specific attributes may be designated as "searchable" through the use of an appropriate searchable indicator 736. In other words, attributes designated as searchable may be prioritized during data capture. Thus, during data capture, specific values may be selected from the possible value list for each of the selected searchable attributes. Similarly, specific units may be selected from the possible unit list for at least some of the selected searchable attributes. Moreover, an attribute may be separately designated as searchable within any category associated with the attribute.

Once data has been captured and stored in a catalog database, it may be desirable to query the catalog database to compare attributes for selected products. To enable such a comparison, each attribute may be designated as comparable through the use of an appropriate comparable indicator 738. During a catalog query, these comparable attributes may be provided to an end user to allow the user to compare these attributes among various products. More particularly, it may be desirable to designate an attribute as comparable in association with a specific category associated with the attribute. In this manner, attributes which will be most helpful to a user who wishes to compare products within a particular category may be specified. By way of example, when a user wishes to compare desktop computers within the category "Desktop," the size of the RAM may be important while the supply voltage typically is not. Alternatively, when a user wishes to compare products such as printers, the size is not important. Thus, the attribute "size" may be selected as comparable within the category "Desktop," while it may not be specified as comparable within the category "Output Device."

Upon submitting a catalog query, the user may select products within a category which are to be compared. In addition, one or more of the comparable attributes may be selected. These selected comparable attributes may then be provided for the selected products to permit a side-by-side comparison of the products. As will be further described, the product data may be obtained from the manufacturer as well as other sources. Once the product data is captured according to the data model, the product data may be stored in one or more databases which may be linked to the data model.

Figure 8A:
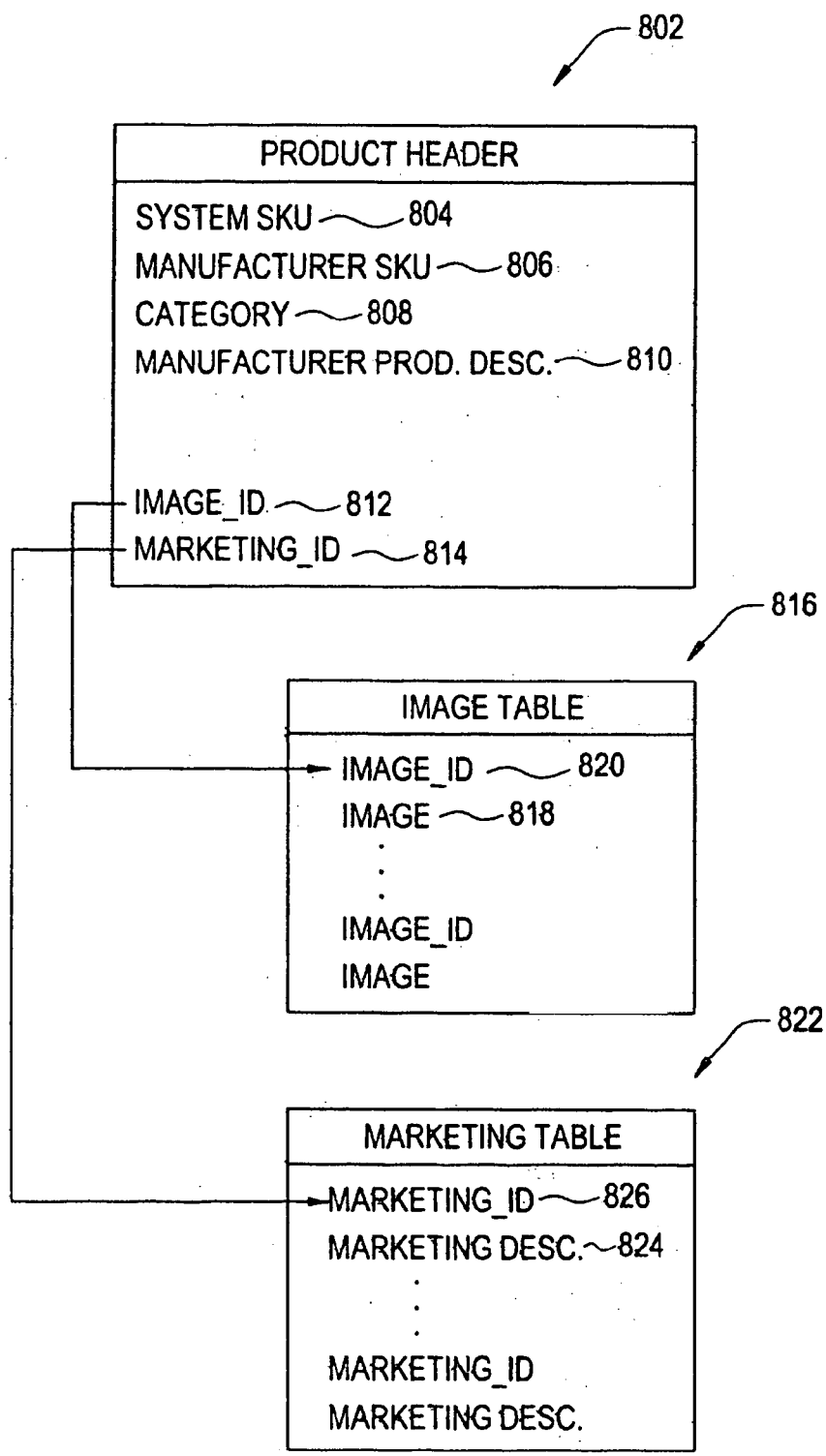
FIG. 8A is a diagram illustrating exemplary data structures that may be used to store a product header of product data according to an embodiment of the invention.

As described above, the product data associated with each product intended for use in a product catalog includes one or more attributes. These attributes may each have one or more values as well as associated units. Moreover, each attribute may have one or more associated indicators (e.g., comparable indicator). In addition to attributes, other product data such as product descriptions and images may be captured for each product. Once captured, data for each product may be stored in a database such as a relational database. However, information that identifies each product must also be associated with the captured data. In order to identify a product for which data has been captured, identifying data is associated with the captured data. As shown in FIG. 8A, such identifying information is stored in a product header 802 according to one embodiment of the invention. As shown, the product header 802 may include a system stock keeping unit (SKU) 804 associated with the product, a manufacturer SKU associated with the product 806, and a link to product information characterizing the product. As shown, the product information may include a category identifier 808 arranged to identify the category associated with the product. Moreover, the product information may further include a manufacturer product description 810 that describes standard features of the product.

Furthermore, additional data associated with the product may be linked to the product header 802. By way of example, in addition to standard features of the product, the product header may include a link to an image 812 as well as to a marketing description 814 of the product. The marketing description 814 may describe other features of the product as well as sales incentives.

Various tables and data records may be linked to the product header 802. By way of example, an image table 816 may include a link to one or more images illustrating the product. As shown, each image 818 may be associated with an image ID 820. Thus, the product header 802 may include the appropriate image IDs 820 which may be used to access the corresponding images as defined in the image table 816.

In addition, a marketing table 822 may include a link to a marketing description for one or more products. As shown, each marketing description 824 may be associated with a marketing ID 826. The product header 802 may therefore include the appropriate marketing ID as a link to the marketing ID 814 which may be used to access the corresponding marketing description as defined in the marketing table 822.

Figure 8B:
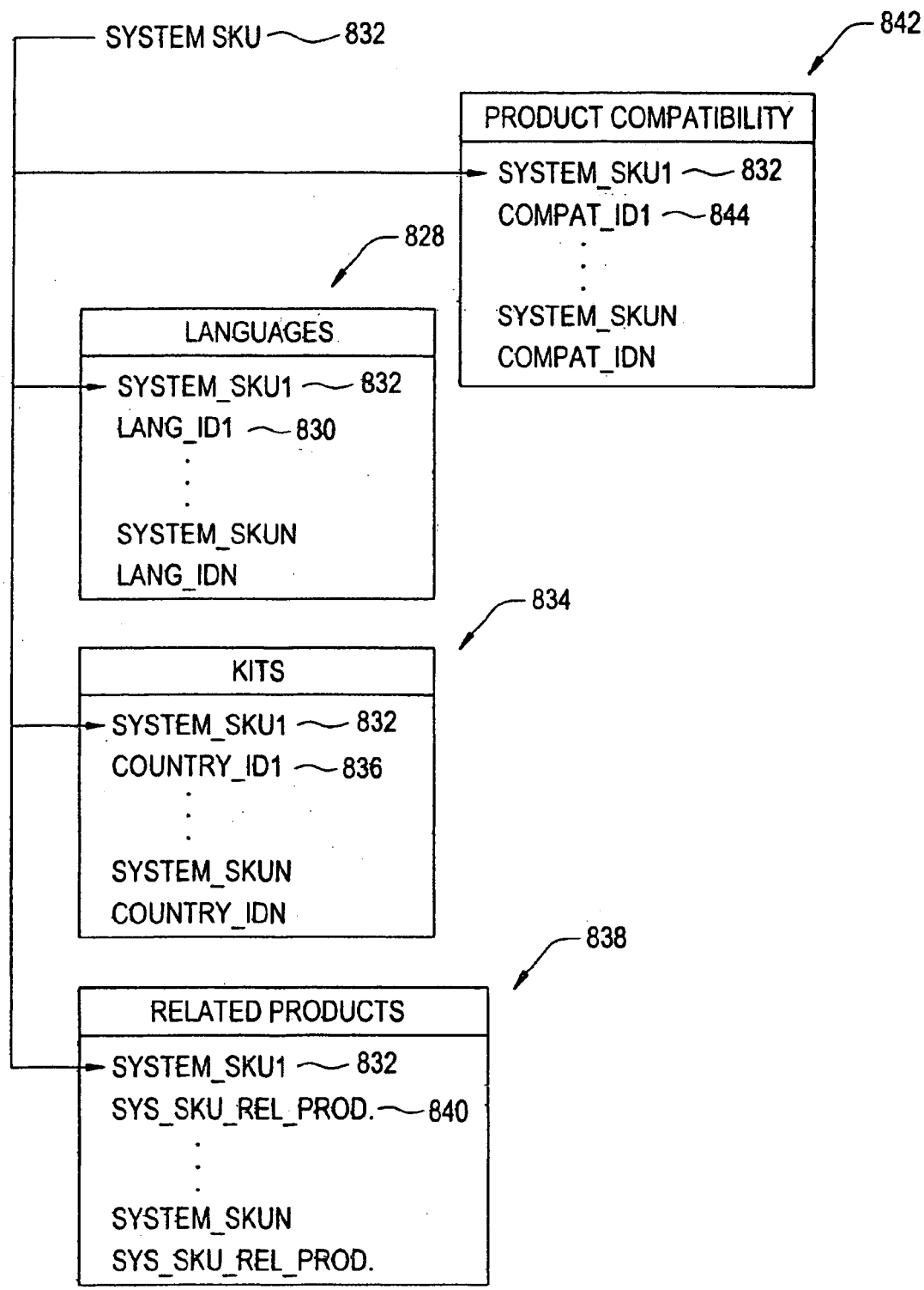
FIG. 8B is a diagram illustrating exemplary data structures that may be used to store various fields of the product data according to an embodiment of the invention.

FIG. 8B is a diagram illustrating exemplary data structures that may be used to store various fields of the product data according to an embodiment of the invention. As shown, a languages table 828 may indicate each language in which the product and documentation associated with the product are available. As shown, each language may be associated with a language ID 830. In addition, one or more languages may be linked to the system SKU 832 associated with the product and corresponding product header. Alternatively, rather than providing a languages table 828, the information provided in the languages table 828 may be captured as standard attributes.

Often products are manufactured for sale in specific countries. By way of example, a device may be designed for use with a specific voltage. To store such information, a country table, or country kits table 834, may specify each country for which the product is adapted for sale. As shown, each country may be associated with a country ID 836. In addition, one or more countries may be linked to the system SKU 832 associated with the product and corresponding product header. Alternatively, rather than providing a country kits table 834, the information provided in the country kits table 834 may be captured as standard attributes.

Manufacturers may recommend products as related or compatible to a product being offered for sale. A related products table 838 may list one or more related products that are recommended as related to the product. As shown, each related product may be associated with a system SKU assigned to the related product 840. These related products may be linked to the primary product via the system SKU 832 associated with the product and product header.

In an industry such as the computer industry, the platform of the product is important when building a computer system. In order to permit a consumer to determine compatibility of various products, a product compatibility table 842 may include platform compatibility information associated with the product. The platform compatibility information may include each platform compatible with the product. By way of example, a computer product may be compatible with at least one of a Macintosh and a PC. As shown, each platform may be associated with a compatibility ID 844. In addition, the appropriate platforms may be associated with the system SKU 832 for the product and product header. Alternatively, rather than providing a product compatibility table 842, the platform compatibility information may be captured as standard attributes during the capture process.

Once all attributes are captured for a particular product, the attributes may be stored as product data. FIG. 8C illustrates exemplary data structures that may be used to store attributes in the product data according to an embodiment of the invention. As described above, each attribute in the data model may have an associated possible value list that identifies values that are selectable for the associated attribute. Once values are selected for at least some of the attributes, the selected attributes may be stored in an attribute table 846. As shown, each of the selected attributes may be identified by a system SKU 848 and an attribute ID 850. In addition, each attribute stored in the attribute table 846 may have at least one of the values in the associated possible value list. Each value may be associated with a value ID 852. The attribute may be further associated with a unit in the associated possible unit list. This unit may similarly be associated with a unit ID 854. However, not all attributes will have associated units. The attribute table may store an attribute which has a single value as well as one which has multiple values as indicated by the multi-value indicator described above.

When an attribute group is a repeating group, an attribute table may contain these repeating attributes. As shown, the repeating attribute table 856 may distinguish between each repetition through the use of a set number 858. In this manner, each instance of an attribute may be distinguished by the corresponding system SKU 848, attribute ID 850, and set number 858. In this manner, values and units may be stored for each instance of an attribute.

Figure 9A:
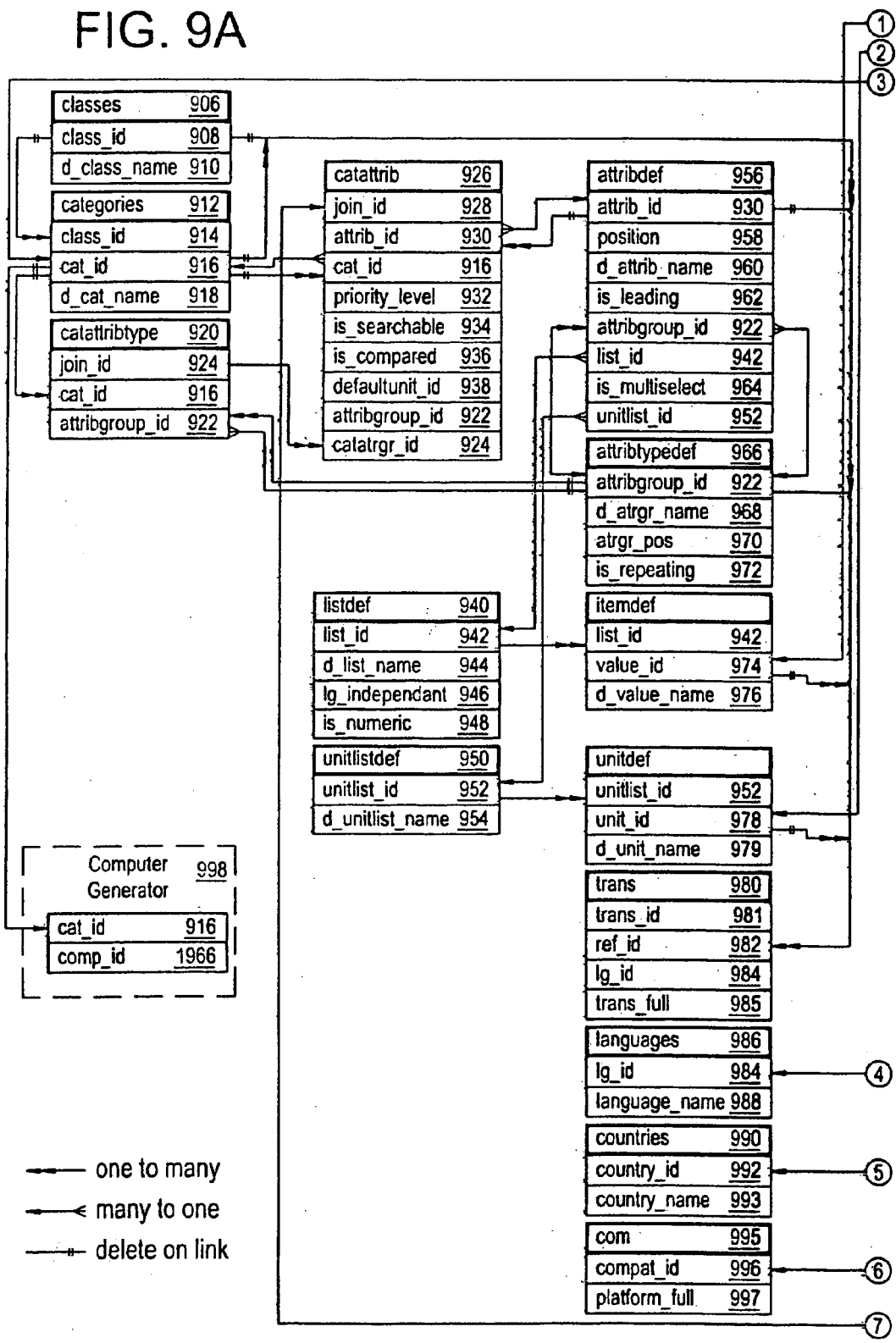
FIG. 9A is a diagram illustrating a specific implementation of the data model using relational databases according to one embodiment of the invention.
Figures 1, 9B:
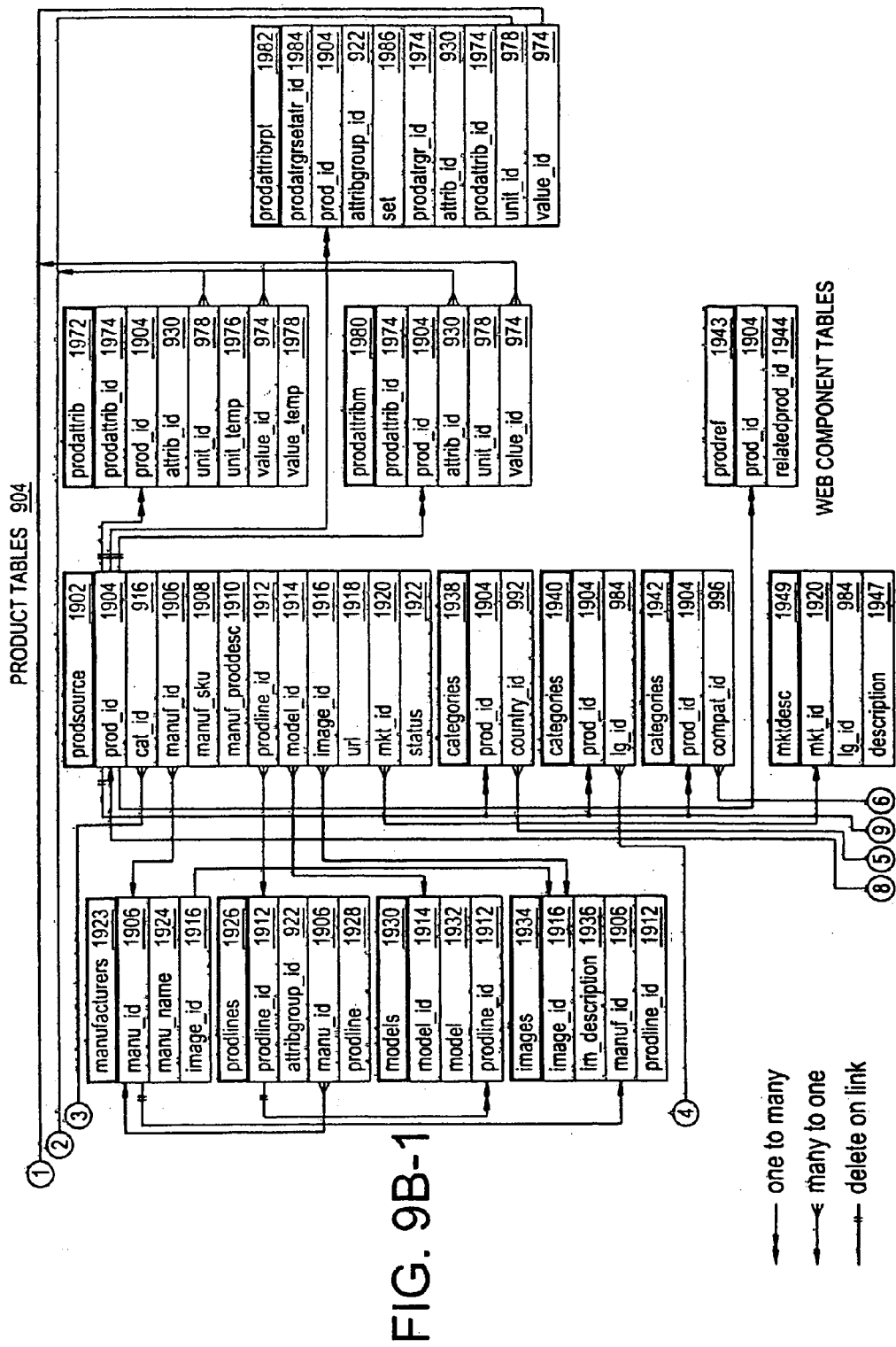
FIG. 9B is a diagram illustrating a specific implementation of the product data using relational databases according to one embodiment of the invention.
Figures 2, 9B:
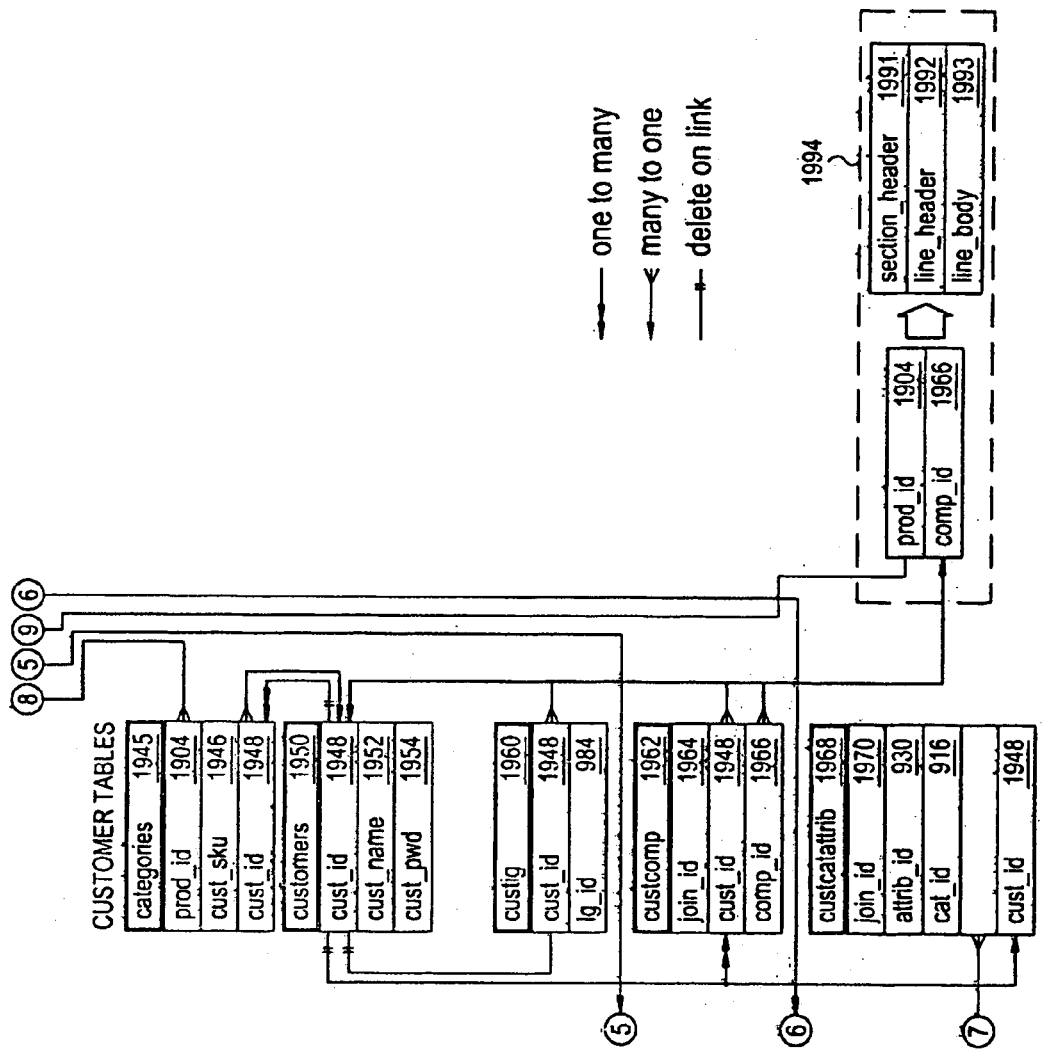

The data model and the product data may be implemented and linked in a variety of manners. FIGS. 9A and 9B illustrate a specific implementation of the data model and the product data using relational databases according to an embodiment of the invention. The data model 902 is shown in FIG. 9A while the product data 904 is shown in detail in FIG. 9B. Although FIGS. 9A and 9B illustrate both the product data 904 and the data model 902 as being stored in a single database, the product data 904 may be stored in a database separate from the data model 902. To simplify the following discussion, the product data 904 is described as being stored in a system product data file. The data may be stored in fields which may be stored and linked through the use of relational databases.

As described above, the data model includes a plurality of data structures which may be used to classify and capture product data. The data model may include a plurality of tables having fields linked as shown. Each class in the data model may be stored in a class table 906. As shown, each class may be identified by a class identifier 908. Identifiers such as the class identifier 908 may be an alphanumeric value which serves as a link to other fields. Thus, through the use of these identifiers, fields in the relational database may be linked. Each class in the class table may include a class name 910.

Each class may include one or more categories, as described above with reference to FIG. 5. These categories may be stored in a category table 912 and linked to the corresponding class through the use of the corresponding class identifier 914. Each category may be identified by a category identifier 916 and a corresponding category name 918.

Within each category definition are one or more associated attribute groups. As described above, each attribute group includes one or more attributes having associated value lists to ensure accurate data capture. Since each attribute group may be used to capture data for more than one category, an appropriate link may be created from each category to the corresponding attribute group. As shown in a category-attribute joining table 920, the category identifier 916 and a corresponding attribute group identifier 922 may be joined to create a unique joining identifier, category-attribute group identifier 924. In this manner, attributes and associated value lists corresponding to the attribute groups for each category may be efficiently accessed.

Similarly, it may be desirable to capture various attributes in relation to more than one category. By way of example, the attribute "size" may be relevant in multiple categories. In order to provide a mapping between each category and corresponding attributes, a category-attribute mapping table 926 may be created. As shown, the table includes a unique joining identifier, category-attribute identifier 928, which may be created by joining an attribute identifier 930 corresponding to the attribute and the category identifier 916 associated with the attribute. This category-attribute identifier 928 may therefore be used to access each attribute (and corresponding value/unit lists) associated with a particular category.

Within the category-attribute mapping table 926, each attribute associated with a particular category may have a data capture priority indicator 932 that assigns a priority to the attribute for data capture. By way of example, the data capture priority indicator 932 may designate an integer priority level to the corresponding attribute. In this manner, a capture order may be assigned to the attributes within a particular category. The priority level may be an integer unique to the attribute within the particular category. Alternatively, the priority level may be used to create prioritized sets of attributes, each attribute within a set having the same priority level.

As described above, each attribute within the category-attribute mapping table 926 may be designated as searchable 934 within the corresponding category. Thus, designation of an attribute as searchable may indicate that capture of the attribute is mandatory and therefore the attribute should also have a high priority level. Once captured, the values associated with the attribute may be transmitted to one or more customers. In this manner, the product data associated with captured attributes may be made available for product searches and comparison.

During product comparison, it may be desirable to provide only some of the attributes within a specific category to allow comparison of these attributes for multiple products. Thus, an attribute may be specified as comparable 936 through an indicator such as a flag. The comparable attribute may then be provided for selection by an end user to indicate that values for the selected comparable attribute are to be displayed for multiple selected products.

Each attribute may have an associated value as well as a unit. In order to facilitate the data capturing process, a default unit may be provided for the corresponding unit. By way of example, for the attribute "Clock Speed" a default unit "MHz" may be established. As shown in the category-attribute mapping table 926, the default unit may be specified by a default unit identifier 938. The category-attribute mapping table 926 may further include the corresponding attribute group identifier 922 as well as the category-attribute group identifier 924 to create appropriate links for each attribute.

As described above, each attribute may have one or more values. In addition, to simplify the data capturing process, each attribute may have an associated possible value list 940 identifying values that are selectable as values for the attribute. Each possible value list 940 is identified by a value list identifier 942 and a value list name 944. As described above, an attribute may be language dependent. Therefore, a language dependent indicator 946 that indicates availability of a translation of record data associated with the attribute is provided in association with the possible value list 940. Although the language dependent indicator 946 is associated with the possible value list 940, it may also be associated with the entire attribute as well as associated units. In addition, it may be specified whether the possible value list 940 is numeric 948. By way of example, the attribute "Data Bus Speed" will have an associated numeric value list while the attribute "Type" associated with an attribute group "Memory/Cache" will have an alphanumeric value list (e.g., DRAM, ROM). Thus, whether the possible value list 940 is numeric 948 may be used to facilitate the output (e.g., display) of the possible value list 940.

In addition, each of the attribute values may have an associated unit. Thus, each attribute may have an associated possible unit list 950 containing units that are selectable as units for the attribute. The possible unit list 950 may be identified by a unit list identifier 952 and a unit list name 954. As previously indicated, the unit list identifier 952 may be an alphanumeric value used in a relational database system.

The attributes within the data model may be stored in an attribute table 956. As shown, each attribute stored in the attribute table 956 includes the corresponding attribute identifier 930. In addition, a position 958 of the attribute within the associated attribute group may be provided for display purposes. By way of example, the position 958 may indicate the order in which the attribute is printed or displayed. Moreover, an attribute name 960 (e.g., upgradability) associated with the attribute may be provided to identify the attribute for which values are being captured. Accordingly, data entry personnel may correctly identify the attribute for which data is to be captured.

During data capture, attributes within each attribute group corresponding to a particular category are provided for data entry. By way of example, the attributes may be printed or displayed for user selection. For each attribute group, it may be more informative and therefore preferable to provide a specific one of the attributes first to assist in the data capturing process. Thus, a leading indicator 962 may specify which attribute is leading within a particular attribute group. By way of example, if a particular attribute is leading, the leading attribute is the first attribute output (e.g., displayed or printed) within the corresponding attribute group.

As described above, each attribute is associated with its attribute group identifier 922 and the associated value list identifier 942. In addition, more than one of the values within the associated possible value list 940 may be selected for specified attributes. For these attributes, a multi-value indicator 964 may indicate that more than one of the values in the associated possible value list are selectable. By way of example, a product may be available with a cache size of 1 GB as well as 2 GB and therefore values "1" and "2" are both selected. The unit list identifier 952 identifies the associated unit list 950 (e.g., MB, GB).

Each attribute may have an associated attribute "type" 966. By way of example, the attribute type 966 may be defined by the attribute group identifier 922 associated with the attribute, an attribute group name 968 associated with the attribute group identifier 922, and a position of the attribute group 970 (e.g., among other attribute groups) for output purposes. Thus, an attribute group may be output according to the specified position of the attribute group 970.

Products often have duplicate features (e.g., multiple ports) for which identical attributes may be captured. As a result, the same attribute group may be provided each instance the data must be captured. For this purpose, a repeating indicator 972 is used to specify whether the attribute group is repeating. By way of example, a product for which data is being captured may be classified in a category according to the data model. Once classified, a listing of potential values associated with each of the attributes in the category of the classified product may be provided for selection. When the repeating indicator 972 indicates that the attribute group associated with the classified product is a repeating group in the data model, the listing of potential values in the attribute group is repeated. In this manner, data capture for "repeating features" is simplified.

Value lists and unit lists associated with each attribute may be separately stored and linked to the appropriate attribute through the corresponding value list identifier 942 and the unit list identifier 952. Thus, each value in the possible value list 940 is associated with the value list identifier 942. In addition, the value has a unique value identifier 974 and a value name 976. Moreover, an abbreviation for the value name may be provided (not shown to simplify illustration). Similarly, each unit in the possible unit list 940 is associated with the unit list identifier 952 as well as a unit identifier 978 and unit name 979. The unit identifier 978 may be an alphanumeric value which permits the linking of various fields in the database. The unit name 979 indicates a unit which may be selected in association with the attribute. By way of example, possible unit names include "KB" and "MB."

Once attribute values and relevant units are captured, the captured data may be transmitted to the customer. Each customer may specify one or more languages in which the customer wishes to receive the captured data. This is particularly important since an attribute name such as "size" may require translation in order for an associated value to be meaningful to a reader or end user. Therefore, a translation table 980 containing translations for each class, category, attribute group, attribute, value or unit in multiple languages is provided. As shown, each entry in the translation table 980 may be identified by a translation identifier 981. In addition, a reference identifier 982 may indicate which class, category, attribute group, attribute, value, or unit is translated. By way of example, the reference identifier 982 may specify an attribute identifier. By way of example, the attribute identifier may specify that the attribute "size" is translated. In addition, a language identifier 984 may specify a language (e.g., German) in which the attribute is translated. Since an attribute may be translated into multiple languages, the reference identifier 982 indicating the attribute being translated is not sufficient to link to the translated data. Therefore, the reference identifier 982 specifying the attribute being translated and the language identifier 984 may be combined such that the translation identifier 981 is unique for the attribute and language in which the attribute is translated. Accordingly, a corresponding translation 985 may be retrieved through the use of this translation identifier 981.

During the data capturing process as well as during transmission of the captured data, product data may be communicated in various languages. In order to store translated data and data relating to availability of translations, a possible languages table 986 indicates one or more languages in which the attributes may be provided during the data capturing process, in which product data may be provided upon transmission to the customer, and in which the product and associated documentation may be available. Each language is associated with the corresponding language identifier 984 and a language name 988 (e.g., German).

In addition, products are typically manufactured for use in specific countries. By way of example, the power supplied by an electrical outlet varies from country to country. In order to capture such information, a possible countries table 990 specifies one or more countries or locales for which a product may be adapted for sale. Each country is identified by a country identifier 992 and a country name 993.

Similarly, in an industry such as the computer industry, a product may be compatible with various platforms. Thus, a possible compatibility table 995 may specify one or more possible platforms with which a product within the industry may potentially be compatible. Each entry may be identified by a compatibility identifier 996 (e.g., integer) and a platform name 997 (e.g., PC).

After the catalog data has been captured for one or more products, the captured catalog data may be formatted prior to distribution to a customer or end user. Such distribution may be performed through various mechanisms including, but not limited to, the transfer of one or more files containing data that has been captured. Alternatively, the catalog data may be distributed in formatted portions, or "components." More particularly, each customer may request that various portions or "components" of the catalog data be transmitted to the customer for selected products. Similarly, an end user may wish to submit a catalog query for data associated with a particular product. By way of example, the end user may wish to obtain a URL associated with the manufacturer's web site or the current technical specifications for the product. Thus, it may be desirable to generate such components according to a format unique to each individual component. As shown in FIG. 9A, a component generator 998 may be used to generate such components. Since the content and format of these components may further depend upon the category within which the product has been classified, the component generator 998 supplies different component definitions for each category and may therefore access the category identifier 916 to determine the type of components and format of each component to be generated. In addition, each component that may be generated in association with the corresponding category is identified by a component identifier 1966. Components which may be generated and methods for generating these components will be described in further detail with reference to FIGS. 13A-13E.

Once the data model has been established, the product data may be captured for various products. FIG. 9B illustrates a specific implementation of a database that may be used to store the product data according to one embodiment of the invention. For each product, a product header 1902 is created which identifies the product. In the product header 1902, a product identifier 1904 (e.g., system SKU) is provided to uniquely identify the corresponding product. In addition, the category identifier 916 that identifies the category associated with the product is provided in the product header. Moreover, a manufacturer identifier 1906 that identifies a manufacturer associated with the product, a manufacturer SKU 1908 assigned by the manufacturer to the product, and a manufacturer product description 1910 is included in the product header 1902 to correctly identify the product manufactured by that specific manufacturer. Thus, the manufacturer product description 1910 is a product description including the name of the product as well as standard features of the product, as will be shown with reference to FIGS. 12B and 13A.

Moreover, each product may be further associated with more detailed identifying information. For instance, a product line identifier 1912 that identifies a particular product line (e.g., Compaq Presario) of the product as well as a model line identifier 1914 that identifies a particular model line (e.g., 4500) associated with the product may be provided. Such product information may be linked to a particular product through the corresponding product header 1902.

As shown, the product header 1902 associated with a particular product may be linked to data associated with the product through associated identifiers. As shown, the product header 1902 may be linked to one or more associated images through the use of a corresponding image identifier 1916 or a URL associated with the product 1918. In addition, the product header 1902 may be linked to a marketing description of the product through a marketing identifier 1920 as well as a status 1922 of the data that has been captured for the product. By way of example, the status 1922 may indicate that data capture for the product has been completed. Once data capture has been completed, the product information may be used by the component generator to generate components.

Data associated with product manufacturers such as manufacturer names and product lines is often relevant to numerous products. Rather than duplicate this information in memory for these multiple fields, it is preferable to store this information in a central location to allow the data to be referenced. Thus, a manufacturer table 1923 includes information associated with each possible manufacturer. Each manufacturer is identified by the manufacturer identifier 1906 (e.g., integer) and manufacturer name 1924, and may be linked to an image identifier 1916 associated with an image. In this manner, an image appropriate for use in a catalog may be associated with a particular manufacturer.

As described above, manufacturers typically manufacture various product lines associated with each product or category of products. Thus, these product lines may be stored in a product lines table 1926. In this table, each product line may be identified by the product line identifier 1912 (e.g., alphanumeric value), the attribute group identifier 922 associated with the product line, the manufacturer identifier 1906 associated with the product line, and a product line name or description 1928.

Similarly, various models are often manufactured for a given product line. Thus, a models table 1930 is provided to store the model information for each product for which data has been captured. For each possible model, the model identifier 1914 (e.g., alphanumeric value), a model name or description 1932, and the product line identifier 1912 may be stored. In this manner, data associated with each product line may be stored in a single location and retrieved for products linked to this information.

Images associated with each product, as well as manufacturers of these products, may be stored in an images table 1934. In this images table 1934, each image may be identified by its image identifier 1916 (e.g., alphanumeric value) as well as an image description 1936 that describes the image. Moreover, each image may be associated with a manufacturer identifier 1906 as well as a product line identifier 1912.

As described above, products such as computer related products are typically adapted for sale in one or more countries. As shown, a country kits table 1938 may include at least one entry corresponding to each product for which data has been captured. Thus, multiple entries in the country kits table 1938 may be used to specify the countries for which the corresponding product is adapted for sale. By way of example, an entry may include the product identifier 1904 associated with the product as well as the country identifier 992 that identifies a specific country for which the product is adapted for sale.

In addition to being adapted for sale in specific countries, the product and associated documentation is typically produced in a limited number of languages. Thus, it is beneficial to use a locales or languages table 1940 to specify one or more languages in which the product and documentation associated with the product are available. As shown, each entry in the locales table 1940 specifies the product identifier 1904 that identifies the product and a language identifier 984 in which the product and/or documentation associated with the product are available. Thus, each product may have multiple associated entries in the locales table 1940.

Manufacturers often wish to inform consumers of potential compatibility or incompatibility of products being offered by those manufacturers. In an industry such as the computer industry, products are compatible with specific platforms. To store such information, a product compatibility table 1942 indicates one or more platforms with which each product for which data has been captured is compatible. Thus, each entry is identified by the associated product identifier 1904 as well as the compatibility identifier 996 that identifies a platform compatible with the product. By way of example, where the product is a computer-related product, the platform may be a Macintosh or a PC. As with many of the tables, the table may include multiple entries for a single product. Although in this case, platforms are stored to indicate compatibility of computer related products, alternate compatibility information may be stored to accommodate industries other than the computer industry.

Similarly, manufacturers often produce products which are related products. In other words, products are specifically manufactured for use with a specific family of products. Thus, a related products table 1943 identifies products that are related to each product for which data has been captured. Each entry in the related products table 1943 therefore includes the product identifier 1904 (e.g., system SKU) associated with the product as well as a related product identifier 1944 (e.g., system SKU) that identifies a product that is related to the product. By way of example, a manufacturer may recommend various products such as printers as compatible or related to a desktop computer for which data is being captured. Thus, the related products table 1943 may include multiple entries in association with a single product.

As described above, a marketing description may be associated with each product. Thus, a marketing description table 1949 stores marketing descriptions associated with these products. Each entry in the marketing description table 1949 may therefore include the marketing identifier 1920 (e.g., integer) identifying the marketing description, a marketing description 1947 associated with the marketing identifier 1920, and the language identifier 984 identifying the language in which the marketing description has been captured. An exemplary marketing description is shown and described in further detail with reference to FIG. 13A.

Capturing and distribution of the product data may be tailored to a customer's specified preferences. By way of example, a customer profile may include one or more customer mapping tables 1945 that identify each customer as well as information associated with each customer. In addition, the tables 1945 may identify each product for which data is to be supplied to the customer, information identifying each customer, a language in which the catalog data is to be transmitted to the customer, one or more components which are to be transmitted to the customer, and customer searchable attribute preferences which identify attributes which are to be supplied to the customer.

As shown, a customer product map 1945 identifies each product for which a particular customer wishes data to be supplied. Each product is identified by the corresponding product identifier 1904, a customer SKU 1946 assigned by that customer to the product, and a customer identifier 1948 that identifies the customer. Accordingly, the customer mapping table 1945 maps the product identifier 1904 (e.g., system SKU) to the customer SKU 1946 assigned to the product by a particular customer. The customer SKU 1946 may be unique to a particular customer. Alternatively, the customer SKU 1946 may be the manufacturer SKU assigned to the product by the manufacturer.

Each customer may be further identified in a customer table 1950. In the customer table 1950, a customer may be identified by the customer identifier 1948, a corresponding customer name 1952, and CUST_PWD 1954, a customer password which may be used to access the customer's account (e.g., FTP catalog upload account).

Customers and ultimately, end users, receiving captured data may be globally situated and may therefore speak different languages. As a result, each customer may wish to specify a language in which the captured data is to be transmitted to that customer. Thus, a customer language table 1960 specifies one or more languages in which the data is to be transmitted to the customer. As shown, an entry is identified by the customer identifier 1948 for a particular customer as well as the language identifier 984 identifying a language selected by the customer.

Similarly, a customer may wish to specify various catalog components which are to be transmitted to the customer in a format suitable for use in a catalog. Component generation will be described in further detail with reference to FIGS. 14A-14E. However, a component may include various types of catalog data, such as a URL, an image, a marketing description, or technical specifications (i.e., extended specifications). Thus, a customer component table 1962 identifies those components that are requested by the customer. A customer-component identifier 1964 may be created by joining the customer identifier 1948 identifying the customer with a component identifier 1966 identifying one of the possible components which may be generated. In this manner, the customer may specify only that data which is desired by the customer. Accordingly, the customer may tailor the data capturing process specifically to its particular needs.

In addition to specifying languages and components, a customer may further wish to select various attributes, or "searchable attributes," which are to be supplied to the customer and therefore searchable in the resulting system. In a customer category attribute table 1968, each such attribute is uniquely identified by a customer attribute preference identifier 1970. The customer attribute preference identifier 1970 is created by joining the attribute identifier 930 that identifies an attribute within the data model, the category identifier 916 associated with the corresponding attribute and the customer identifier 1948.

Upon selection of the attribute preferences by a customer, the data associated with these attributes may be supplied to the customer for the products identified in the customer product map 1945. Since some or all of the requested attribute data may have been previously captured, data for one or more of the identified products is captured as necessary. Once these attributes are captured, the captured attribute values may be stored in one or more product attribute tables. According to the embodiment shown, separate attribute tables may be provided for those attributes which have a single value, those which have multiple values, and those which are "repeating attributes." However, these tables are illustrative only, and therefore a different number of tables as well as a different format may be implemented. As shown, a product attribute table 1972 stores each captured attribute having a single value. Each attribute is identified by a unique product attribute identifier 1974 which may be created by joining the product identifier 1904 with the attribute identifier 930. Thus, the product attribute identifier 1974 identifies the attribute captured for the specific product. In addition, a unit identifier 978 identifying a unit in the corresponding possible unit list may be provided in association with a captured value. Similarly, the value identifier 974 identifies a value in the corresponding possible value list for the captured attribute.

In the illustrated embodiment, a separate attribute table stores attributes having multiple captured values. Thus, a product attribute multi value table 1980 stores each captured attribute having more than one captured value. As shown, the format of this table may be identical to the product attribute table 1972. The separate attribute table 1980 storing attributes having multiple captured values is implemented separately to simplify data management procedures. However, the table 1980 may be implemented in another manner. For instance, this table may be combined with other attribute tables.

Similarly, a product repeating attribute table 1982 stores values and units for all instances of "repeating attributes." As shown, a product repeating attribute group identifier 1984 may be created by joining the product identifier 1904, the attribute group identifier 922, a set number 1986, and the attribute identifier 930 to identify a specific instance (e.g., captured value and unit) of the captured attribute. In addition, a product attribute group identifier 1988 may be created by joining the product identifier 1904 and the attribute group identifier 922. Thus, the product attribute group identifier 1988 identifies the attribute group (e.g., processor) captured for a specific product. In addition, the product attribute identifier 1974 associated with the captured attribute identifies the attribute (e.g., clock speed) captured for the specific product. As shown, the unit identifier 978 and the value identifier 974 are stored.

Components 1994 generated through the use of the component generator shown in FIG. 9A may be stored as shown. Each component is identified by the component identifier 1966 in combination with the product identifier 1904. Moreover, each component may include a section header 1991, a line header 1992, and a line body 1993, as will be further described below with reference to FIGS. 13A-13E. The components may then be transmitted to the customer on a regular basis or upon request.

Figure 9C:
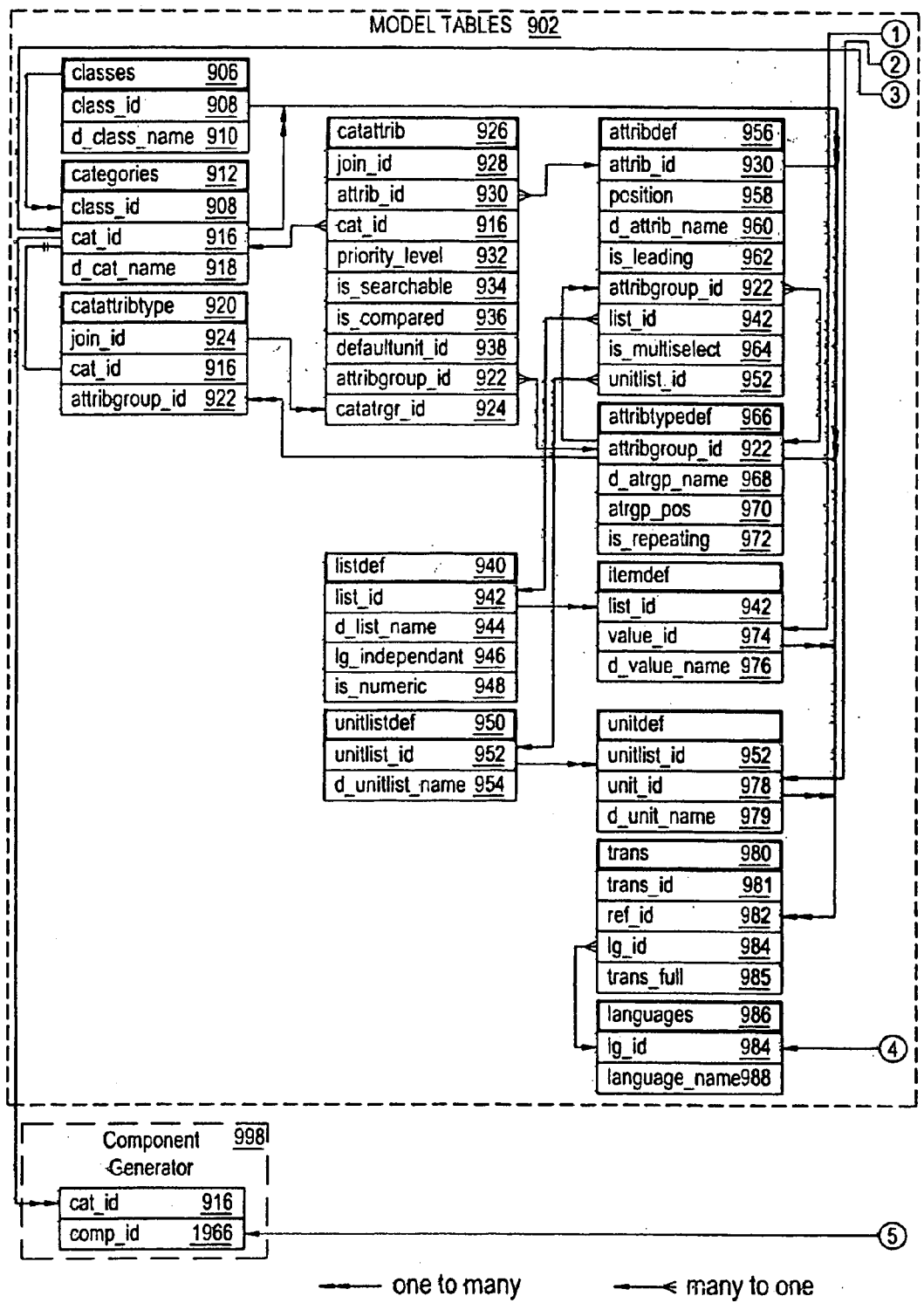
FIG. 9C is a diagram illustrating a specific implementation of the data model using relational databases according to another embodiment of the invention.

FIG. 9C is a diagram illustrating a specific implementation of the data model using relational databases according to another embodiment of the invention. According to this embodiment, a countries table 990 and a compatibility table 995 are not included.

Figures 1, 9D:
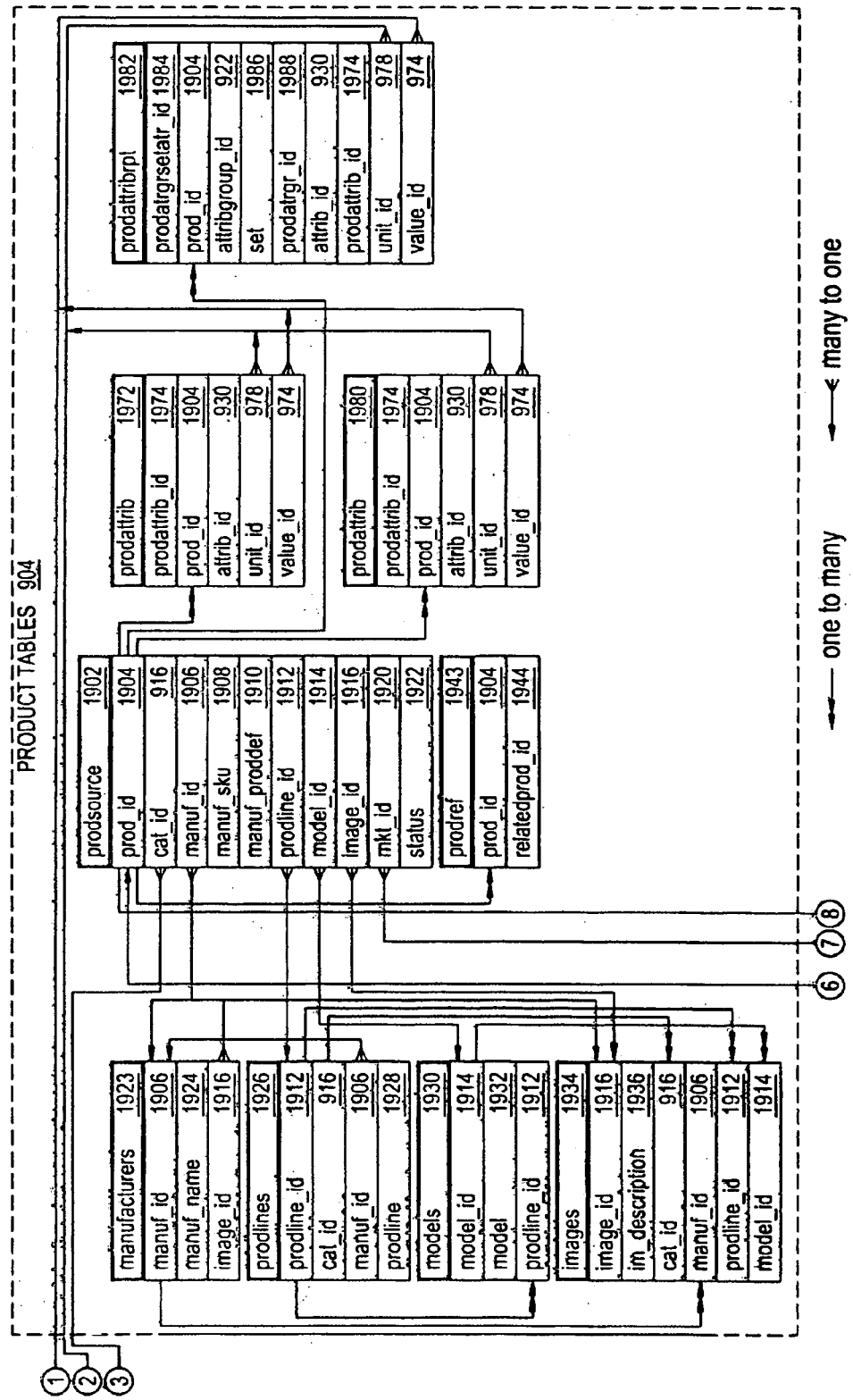
FIG. 9D is a diagram illustrating a specific implementation of the product data using relational databases according to another embodiment of the invention.
Figures 2, 9D:
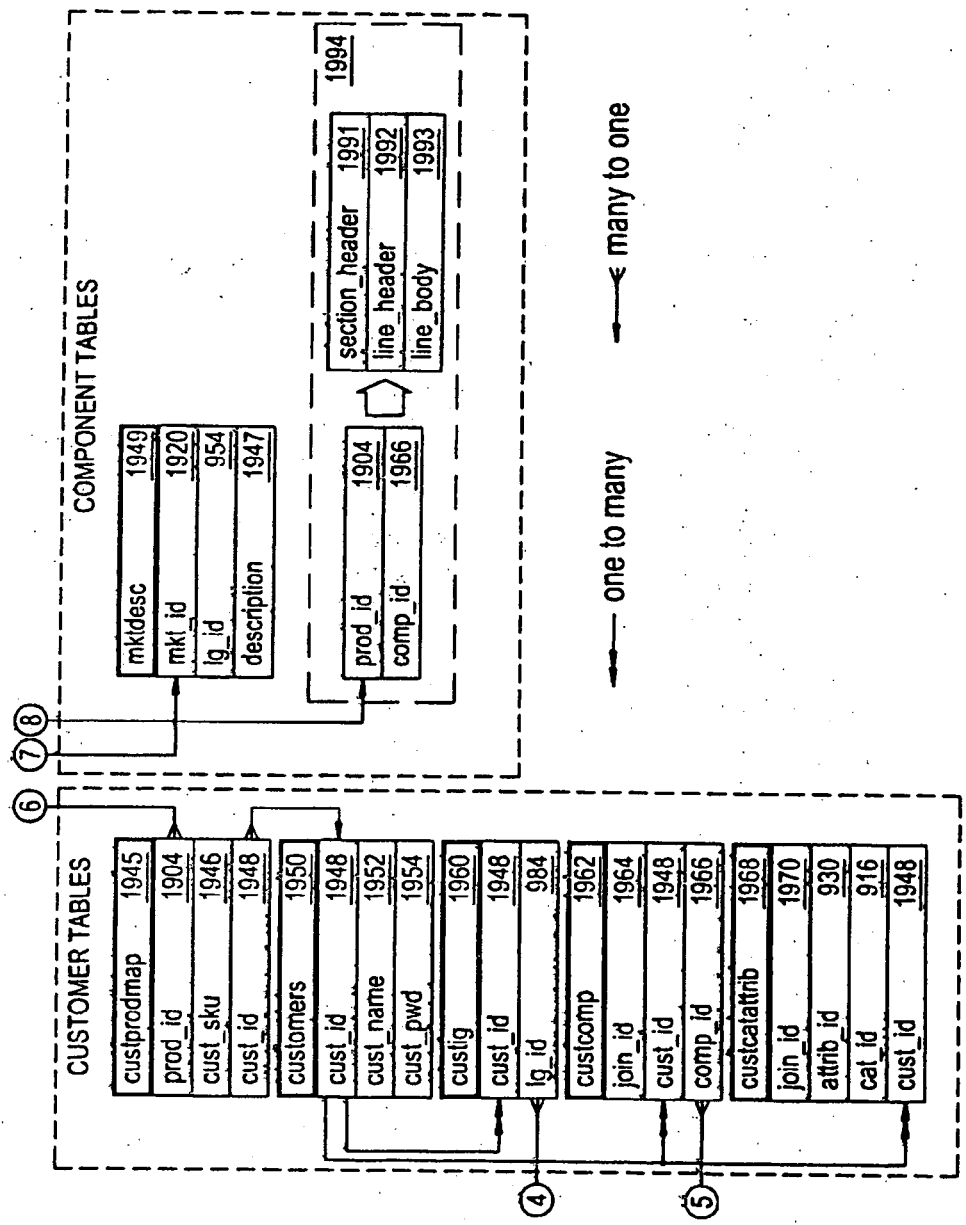

FIG. 9D is a diagram illustrating a specific implementation of the product data using relational databases according to another embodiment of the invention. In this embodiment, a country kits table 1938 is not included. Similarly, this embodiment does not include the locales or languages table 1940 or the product compatibility table 1942 shown in FIG. 9B.

In this embodiment, the images table 1934 is implemented slightly differently than the embodiment illustrated in FIG. 9B. As shown in FIG. 9B, each image is identified by its image identifier 1916 (e.g., alphanumeric value) as well as an image description 1936 that describes the image. As described above with reference to FIG. 9B, each image is associated with a manufacturer identifier 1906 as well as a product line identifier 1912. In this embodiment, each image is further associated with a category identifier 916 and a model identifier 1914.

In addition, in this second embodiment, the product lines table 1926 is implemented slightly differently. Here, rather than associating each product line with an attribute group identifier 922, each product line is associated with the corresponding category identifier 916.

As shown, the product header 1902 associated with a particular product may be linked to a variety of data associated with the product. This data may vary from product to product. For instance, as shown and described above with reference to FIG. 9B, a URL 1918 may be associated with a particular product. Alternatively, according to the embodiment illustrated in FIG. 9D, a URL associated with the product need not be specified in the product header.

Prior to transmission to each customer, the product data may be updated or "maintained" through the use of the above data structures. FIG. 10A is a flow diagram illustrating a method of catalog maintenance according to an embodiment of the invention. The process begins at step 1000 and a customer product portfolio file is received at step 1002 from a customer. The customer product portfolio file may include information that identifies the customer as well as information that indicates product information that the customer requests be captured as necessary and transmitted to the customer. (e.g., products for which data is requested by the customer). The customer product portfolio file is then mapped to the system product data file such that each missing product that is not in the system product data file is identified at step 1004. Once one or more missing products are identified, data for the missing products may be captured and added to the system product data file at step 1006. Since the system product data file now contains data for the missing products, the data may be compiled and formatted in a manner suitable for use in a catalog. Thus, component data formatted for use in an electronic catalog may be generated for the missing products at step 1008. By way of example, the component data may include a standardized product description, main technical specifications, extended technical specifications, a marketing description, an image, and a URL associated with the product. Generation of the component data is described in further detail with reference to FIGS. 13C-13E.

A customer may wish to receive product data in the form of portions or "components." By way of example, the customer may be interested in receiving specific information for new products on the market (e.g., missing products). In this manner, the customer may limit the product data it receives. However, in addition to or as an alternative to receiving product data in the form of components, the customer may wish to receive all captured data associated with specified products. Thus, this enriched product data may be generated from the system product data file according to a customer profile at step 1010. The generation of enriched product data is described in further detail with reference to FIGS. 14A-14B. The enriched product data may then be transmitted at step 1012. The process ends at step 1014. As shown in FIG. 10A, data may be generated for use by a particular customer according to that customer's preferences 1010 simultaneously with the capture of data 1006 and generation of component data 1008. This is particularly important since the data capturing process may be a time-consuming one since it may be performed, at least in part, by a manual process. As a result, capturing, storing, and distribution of data is performed in an efficient manner.

As described above, a customer product portfolio file may specify products for which the customer wishes to receive enriched product data. FIG. 10B is an exemplary product portfolio file received in step 1002 of FIG. 10A according to an embodiment of the invention. As shown, the customer product portfolio file may include a manufacturer SKU 1016 associated with a product, a customer SKU 1018 assigned by the customer to the product, a manufacturer identifier 1020 for the product that identifies a manufacturer of the product, and a brief product description 1022 describing the product.

In order to maintain existing system data, it may be necessary to create records for products which are not identified in the system product data file. Thus, it may be desirable to map manufacturers and products identified in the customer product portfolio file to corresponding records in the system product data file. FIG. 11 is a flow diagram illustrating a method of mapping customer data to system data as shown in step 1004 of FIG. 10A according to an embodiment of the invention. The process begins at step 1100 and at step 1102, a manufacturer identified in the customer product portfolio file is mapped to a system manufacturer file or table. The system manufacturer file may be included in the system product data file. It is then ascertained whether the manufacturer is new at step 1104. In other words, if the manufacturer is not identified in the system product data file, the manufacturer is a new manufacturer. If it is determined at step 1104 that the manufacturer is new, a manufacturer identifier is assigned to the new manufacturer and the manufacturer identifier is stored in the system product data file at step 1106. In addition, the record containing the new manufacturer may be flagged as new. If it is determined that there are more manufacturers to map at step 110, the process continues at step 1102.

As described above, if a record for a product for which data has been requested does not exist, it should be created in the system product data file to enable product data to be captured and stored for the product. Thus, at step 1110, a customer SKU identified in the customer product portfolio file is mapped to a system SKU. By way of example, this may be performed through the use of the manufacturer identifier in combination with the manufacturer SKU as provided in the customer product portfolio file and shown in FIG. 10B. At step 1112, it is ascertained whether the customer SKU is new. By way of example, if the customer SKU is not identified in the system product data file, the customer SKU requires a new system SKU. If the customer SKU is new, a new system SKU is created at step 1114 such that the new system SKU is mapped in the system product data file to the customer SKU. When the new system SKU is created, a new system SKU is assigned to the new record and the record may be flagged as new. If it is determined that there are more customer SKUs in the customer product portfolio file at step 1116, the process is repeated at step 1110.

Once a new system SKU is created, the system SKU may be classified according to the data model at step 1118. To simplify the process, the new system SKUs may be classified during one step as shown. Alternatively, each new system SKU may be classified separately during the mapping process.

As described above, new system SKUs are created for customer SKUs that are new. However, it is possible that customer SKUs provided in the customer product portfolio file may be unrecognizable and therefore invalid. According to one embodiment, a customer SKU is unrecognizable when the corresponding manufacturer SKU cannot be found. Therefore, any unrecognizable customer SKUs may be identified and reported to the customer at step 1120. The process may then continue at step 1006 and 1010 of FIG. 10A.

Figure 12A:
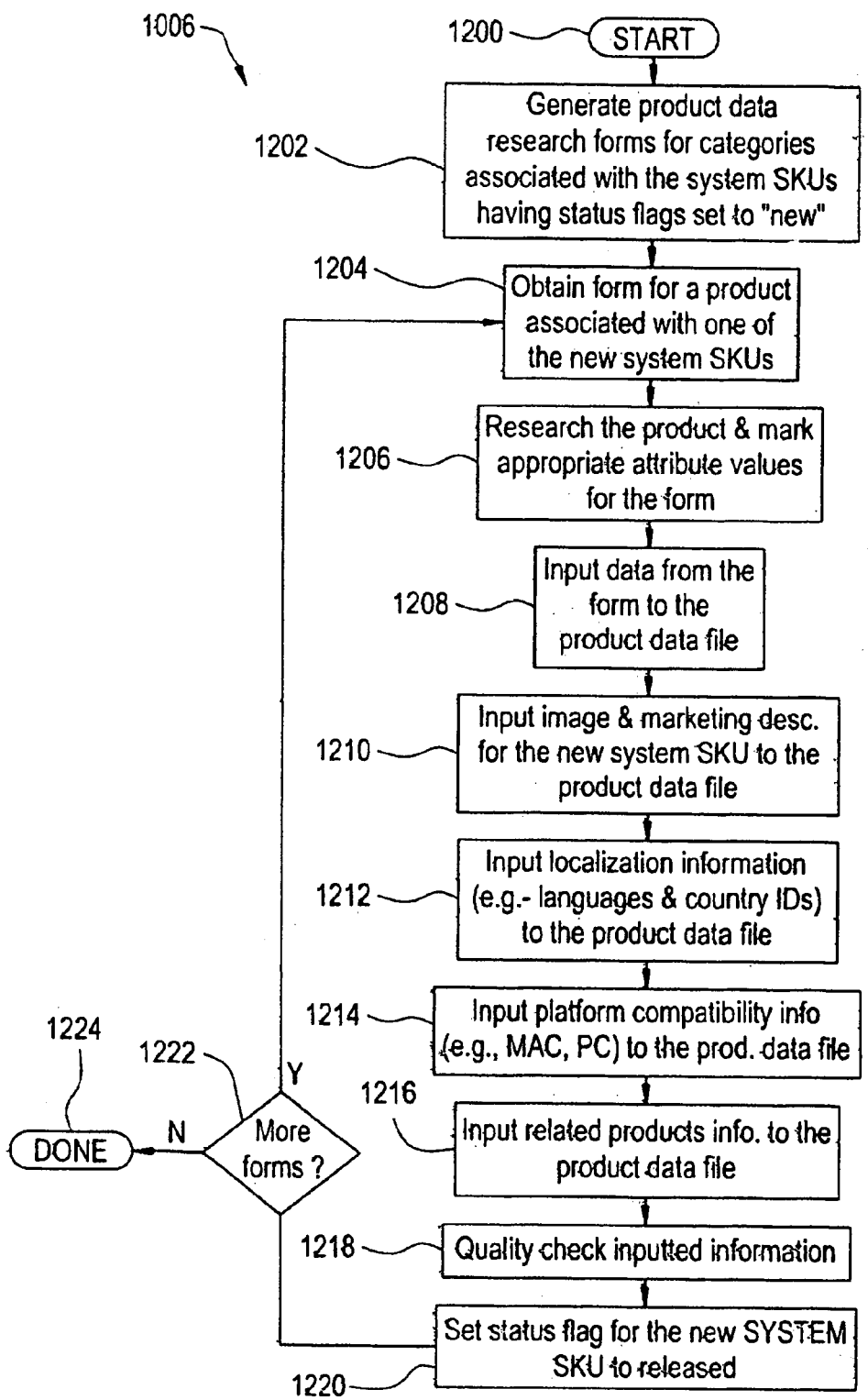
FIG. 12A is a flow diagram illustrating a method of capturing product data for missing products as shown in step 1006 of FIG. 10A according to an embodiment of the invention.

Once missing products are identified in the system product data file and records are created for these missing products, data may be captured and added to the system product data file. FIG. 12A is a flow diagram illustrating a method of capturing product data for missing products as shown in step 1006 of FIG. 10A according to an embodiment of the invention. The process begins at step 1200. The product data may be captured according to a manual process as well as an automated process. In the following example, product data research forms are generated and used during a manual data capturing process. Product data research forms may be generated at step 1202 for categories associated with new system SKUs (e.g., system SKUs having status flags set to "new"). A product data research form may then be obtained for a product associated with one of the new system SKUs at step 1204. As shown at step 1206, the product may be researched and appropriate attribute values may be selected and marked on the product data research form. Data from the product data research form may then be input to the system product data file at step 1208.

In addition to inputting information associated with one or more attributes for the missing product, further product information may be input to the system product data file as shown in steps 1210 through 1216. By way of example, at step 1210, one or more images illustrating the product may be input to the system product data file, in addition to an expanded marketing description for the new system SKU. At step 1212, localization information may be input to the system product data file. By way of example, one or more languages in which the product and documentation associated with the product are available may be specified. As yet another example, one or more countries for which the product is adapted for sale may be input to the system product data file. In addition, platform compatibility information may be specified at step 1214. By way of example, the platform compatibility information may indicate that the product is compatible with a Macintosh or a PC. Similarly, related products information may be input to the system product data file at step 1216. By way of example, the manufacturer may recommend one or more products as related to the product. A quality check may be performed on the inputted information at step 1218. By way of example, inputted data may be checked against completed product data research forms. In addition, the status flag for the new system SKU may be set to "released" at step 1220. If it is determined that there are more forms at step 1222, the process continues at step 1204. Once data for all forms and associated products is entered into the system product data file, the process is completed at step 1224.

As described above, once the product has been classified according to the data model, a data entry template associated with the category of the classified product may be rendered to facilitate the capture of product data. By way of example, the data entry template may be a product data research form that includes a listing of potential values associated with each of the attributes in the category of the classified product. Alternatively, the data entry template may be provided via an automated computer process. FIG. 12B illustrates an exemplary product data research form that may be used to capture product data as shown in FIG. 12A according to an embodiment of the invention. Within each class of the data model, a product data research form may be generated for each possible category of products. An identifying form header 1226 may be provided to identify the specific product being researched. By way of example, the form header 1226 may include a manufacturer identifier 1228, a manufacturer SKU 1230, a product line 1232, a model number 1234, a manufacturer product description 1236, a system SKU 1238, and a category identifier 1240.

In addition to identifying the product being researched, data relating to the status of the data capture may be indicated by the researcher. By way of example, a name of the researcher 1242 and date/time 1244 may be provided upon completion of research for all mandatory (e.g., searchable) attributes 1246, when the form has been transmitted for data capture 1248, upon completion of data capture 1250, and when all data has been checked 1252.

During the capturing process, the attribute group name 1254 (e.g., Processor) and attribute name 1256 (e.g., Form Factor) of each attribute may be provided, along with an associated possible value list 1258. In addition, an attribute indicator 1260 may be provided which indicates whether capture of the attribute is mandatory as well as whether a single value or multiple values are to be selected from the possible value list 1258. Although data may be captured manually, this process may be automated.

Once data has been captured, the data may be compiled in a format suitable for use in a catalog. FIG. 13A is a proof data sheet illustrating exemplary components that may be generated for use in a catalog according to an embodiment of the invention. As shown, the proof data sheet may indicate a language 1300 in which the data is provided, a manufacturer identifier 1302, a manufacturer SKU 1304, a quantity 1306 in which the product may be packaged (e.g., in multiples of 5, 10, 100, etc.), and a system SKU 1308. Various components may be generated for use in a catalog. Several exemplary components are a standardized description 1310, a marketing description 1312, an extended description (i.e., main specifications) 1314, and technical specifications (i.e., extended specifications) 1316. The proof data sheet may then be used by the researcher to verify that catalog data has been entered correctly.

For each component that may be generated for use in a catalog, the component may have a format specified according to a component definition. Moreover, each component definition may be defined in association with one or more categories. FIG. 13B is a component generator report illustrating exemplary component definitions for creating components according to an embodiment of the invention. Within each category 1318, a component definition for each possible component 1320 may be defined. Each component definition may further include a section header 1322, at least one line header 1324, and a line body definition 1326 corresponding to each line header definition. Each line body definition 1326 includes rules defining the contents of the line body. The contents of the line body are obtained according to the rules from the product data as well as "literals" defined in the rules which are displayed in the line body (e.g., "x"). By way of example, as shown, the component, "Technical Specifications," 1320 may include the section header, "General," 1322. Below this section header, the line headers 1324 "Product Form Factor," "Dimensions," and "Enclosure Color" are provided with corresponding line body definitions 1326. Thus, the line header may identify an attribute group associated with the product and corresponding category.

Figure 13C:
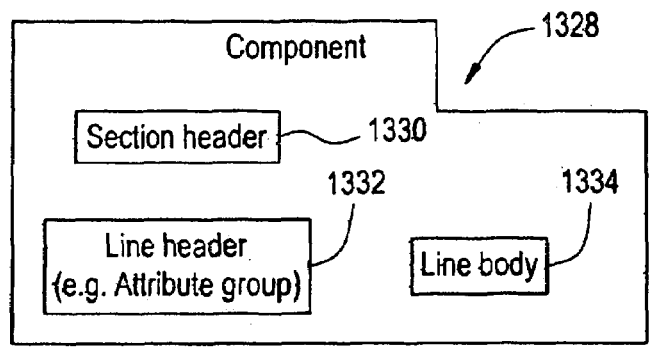
FIG. 13C is a diagram illustrating an exemplary component format that may be used to create components according to an embodiment of the invention.

Once built, each component definition may be used to create a component having the contents and format specified by the component definition. FIG. 13C is a diagram illustrating an exemplary component format that may be used to create components according to an embodiment of the invention. As shown, a component 1328 may include a section header 1330, at least one line header 1332, and a line body 1334 corresponding to each line header 1332.

Figure 13D:
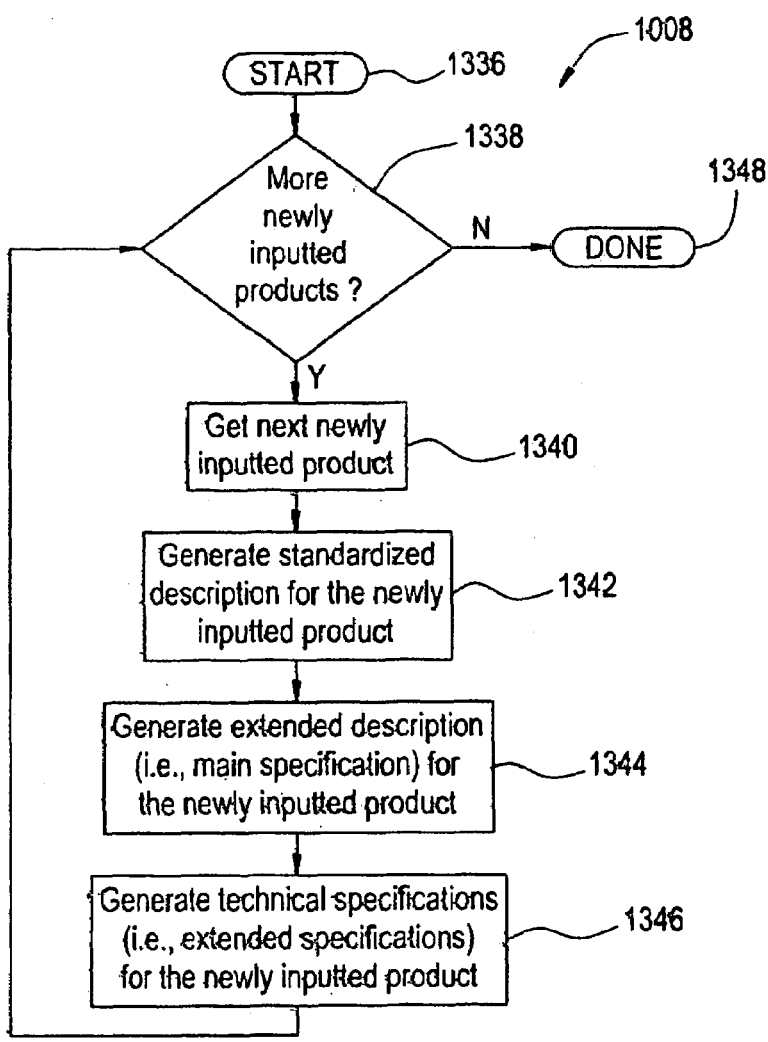
FIG. 13D is a flow diagram illustrating a method of generating component data for missing products as shown in step 1008 of FIG. 10A.

A method of generating component data as may be performed with data captured for previously "missing" products as shown in step 1008 of FIG. 10A is illustrated in FIG. 13D. The process begins at step 1336 and at step 1338, it is determined whether there are more newly inputted products (e.g., products previously missing from the system product data file) for which component data is to be generated. If there are more products, a next one of the "missing" products is obtained at step 1340. Once obtained, one or more components may be generated for the missing product. By way of example, a standardized description may be generated for the missing product at step 1342. In addition, main technical specifications may be generated for the missing product at step 1344. As another example, extended technical specifications may be generated for the missing product at step 1346. When it is determined at step 1338 there are no more missing products, the process completes at step 1348.

Figure 13E:
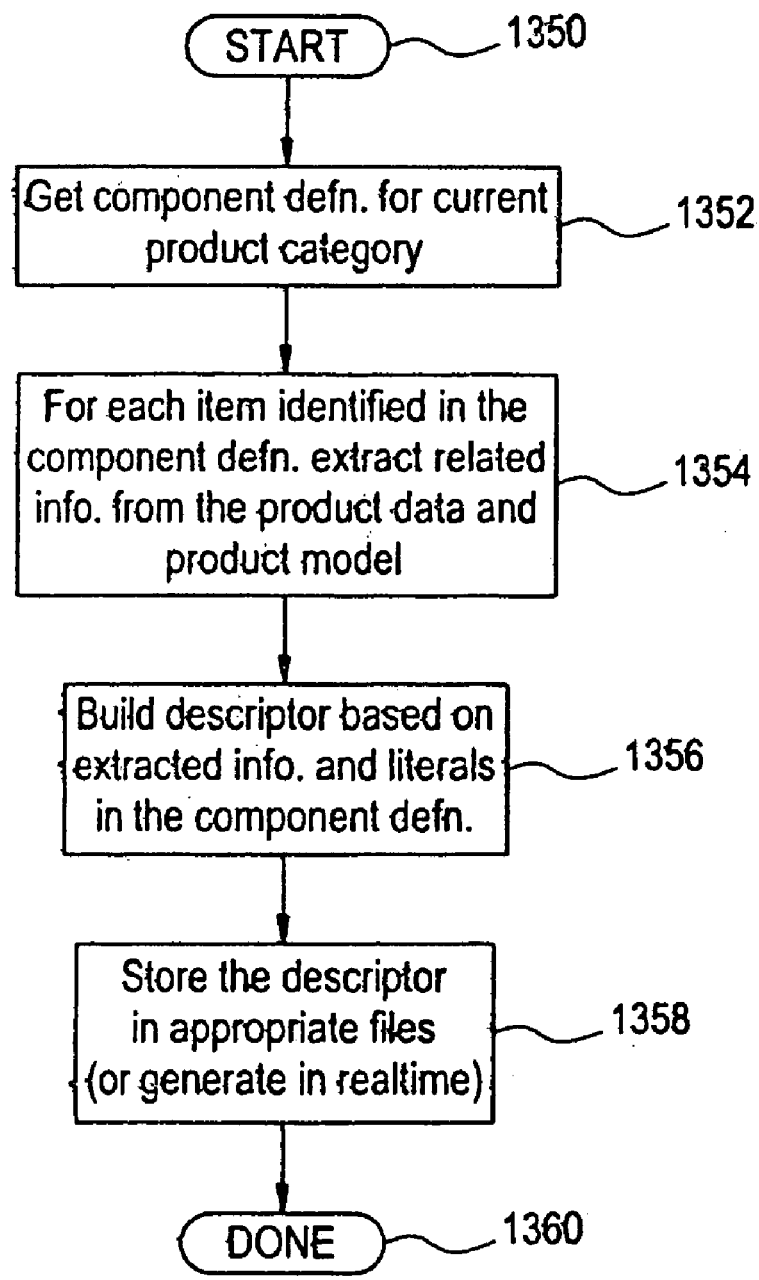
FIG. 13E is a flow diagram illustrating a general method of generating a component according to an embodiment of the invention.

As shown in FIG. 13D, various component data may be generated for a particular product. FIG. 13E is a flow diagram illustrating a general method of generating a component according to an embodiment of the invention. The process begins at step 1350 and at step 1352, a component definition may be obtained for the product category. For each item identified in the component definition, information may be extracted from the product data and the data model at step 1354. A component descriptor (e.g., technical/extended specifications) may then be built based upon the extracted information and the component definition (e.g., literals provided in the component definition) at step 1356. The descriptor may then be stored in the appropriate files or generated in real-time at step 1358. By way of example, the component descriptor may be provided in response to a catalog query. The process completes at step 1360.

A customer may request that enriched product data be provided to the customer according to that customer's preferences. FIG. 14A.*is* a flow diagram illustrating a method of generating enriched product data as shown in step 1010 of FIG. 10A according to an embodiment of the invention. As will be described, this enriched product data may be generated from the system product data file according to a customer profile. The customer profile may identify at least one customer and associated customer searchable attribute preferences specified by each customer. By way of example, the customer searchable attribute preferences may specify attributes (e.g., according to category) for which values are to be transmitted. The process begins at step 1402 and at step 1404, system records associated with the customer may be obtained from the system product data file. As described above with respect to FIG. 12A, after data is captured for missing products, the status flags for these system records may be set to "released." Thus, system records for customer SKUs having status flags set to "released" may be obtained to prepare this captured data for transmission to the customer. Enriched product data may then be generated for each of these system records in steps 1406 through 1418.

Each relevant system record is processed individually. Thus, at step 1406, a system record associated with a customer is obtained from the system product data file (e.g., one of the released system records) for processing. Next, at step 1408, a product header is created from the system record. This product header is different from the product header that is stored in the system file. Rather, this new product header will be associated with data that is to be exported to the customer. By way of example, the product header may include a customer SKU associated with the system record. In addition, the product header may include a system SKU that identifies a product associated with the system record, a category identifier that identifies a category in which the product is classified, a manufacturer product description describing standard features of the product, a product line associated with the product and a model number for the product. The product header may then be exported to identify the exported attributes.

In addition, attributes associated with the system record may be exported based upon the customer searchable attribute preferences at step 1410. For instance, the attributes that are exported may include, but are not limited to, an attribute ID associated with the attribute, a value ID associated with each value assigned to the attribute, and a unit ID identifying a unit for the attribute. In addition, these attributes may be indexed by customer SKU.

It is important that the product data that is exported be useful to the customer requesting the data. Most importantly, when the data is obtained and displayed by a search engine, it is important that the data be displayed so that product comparisons can readily be made. However, this may be difficult since the units associated with products being compared may differ. As a result, it may be difficult to compare the attribute values associated with various products. For instance, the memory size for a computer product may include 1500 MB, 3 GB, 600 MB, and 7 KB. Although the value 1500 is larger than the value 3, 3 GB is actually larger than 1500 MB since the units differ. Therefore, according to one embodiment of the invention, possible attribute value-unit combinations are normalized to permit values to be compared by an end-user.

Normalizing numeric value-unit combinations may be performed prior to data capture or upon completion of data capture. Thus, each value in the possible value list may be combined with each one of the units in the associated possible unit list for one of the attributes to create a possible value-unit combination. Each possible value-unit combination is then assigned a normalized value. Alternatively, the ordering of possible attribute values-unit combinations may be performed for only the subset of data that the customer has requested upon completion of data capture. For instance, each attribute value and associated unit may be assigned a value such that the smallest value is assigned the value of "1" while each value larger in size is assigned the next highest integer. Therefore, according to the previous example, 7 KB is assigned the value of "1", 600 MB is assigned the value of "2", 1500 MB is assigned the value of "3", and 3 GB is assigned the value of "4". Accordingly, normalized numeric values are assigned to attribute value and unit combinations so that attributes may be ordered appropriately by a search engine for display to an end-user.

Similarly, lists of related products may be transmitted to the customer. As shown, at step 1412, a list of related products associated with the system record may be produced. By way of example, the list of related products may be those products recommended by the manufacturer. Related product information may include the customer SKU associated with the system record as well as a customer SKU for each of the related products. As described above, the customer SKU associated with the system record may be obtained from the product header. If it is determined at step 1414 that there are more records, the process continues at step 1406.

As described above, the customer may receive product data in one or more specified languages. To accommodate such a request, multiple translations may be compiled and transmitted to the customer. Thus, after processing one or more system records, a vocabulary file may be generated and exported based upon the exported attributes (e.g., attribute values) at step 1416. The vocabulary file preferably includes translations for each language dependent attribute. Various fields within each attribute may be language dependent (e.g., unit).

The customer may wish to receive a list of those attributes it is receiving. By way of example, if the customer has requested specific attributes, these customer searchable attribute preferences may be exported to identify the attributes that the customer is receiving at step 1418. The process is completed at step 1420. In this manner, updated product data suitable for use in an electronic catalog may be captured, stored, and distributed to various customers.

Figure 14B:
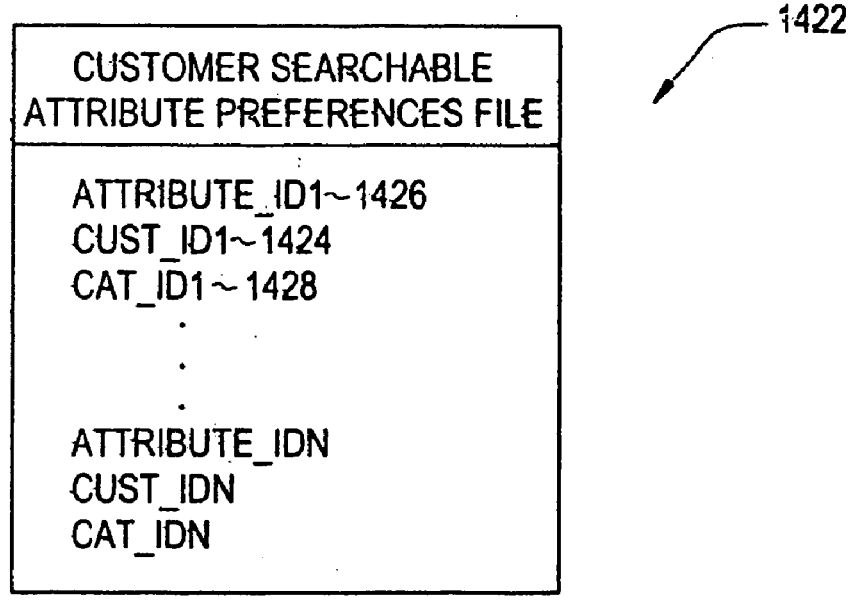
FIG. 14B is a diagram illustrating an exemplary customer searchable attribute preferences file that may be used in generating enriched product data as shown in FIG. 14A.

As described above, a customer may indicate specific attributes for which the customer wishes to receive product data. FIG. 14B is a diagram illustrating an exemplary customer searchable attribute preferences file that may be used in generating enriched product data as shown in FIG. 14A. As shown, the customer profile includes a customer searchable attribute preferences file 1422 which identifies a customer 1424 and customer searchable attribute preferences (e.g., attribute and associated category). Each attribute may be identified by an attribute ID 1426 and the associated category may be identified by a category ID 1428.

Figure 15A:
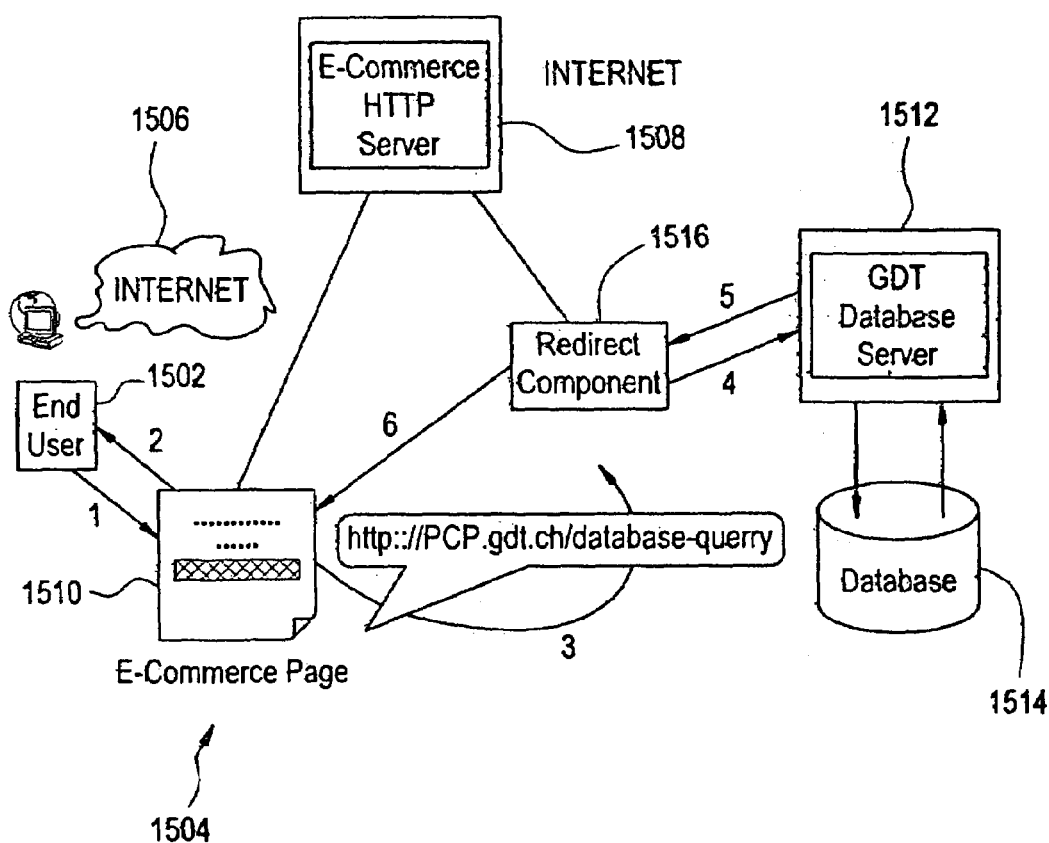
FIG. 15A is a diagram illustrating an exemplary system for retrieving catalog data according to an embodiment of the invention.

FIG. 15A is a diagram illustrating an exemplary system for retrieving catalog data according to an embodiment of the invention. As shown, an end user 1502 may access a web site or web page 1504 via the internet 1506 via an HTTP server 1508. As shown, the web site 1504 provides a query form 1510 which permits a user to query a catalog file such as the system product data file or customer catalog file. The query supplied by the query form 1510 may be sent to the system data base server 1512 which retrieves the requested information (e.g., component) from the system database 1514 (e.g., system product data file). The requested information may then be redirected 1516 to the web page 1504.

Figure 15B:
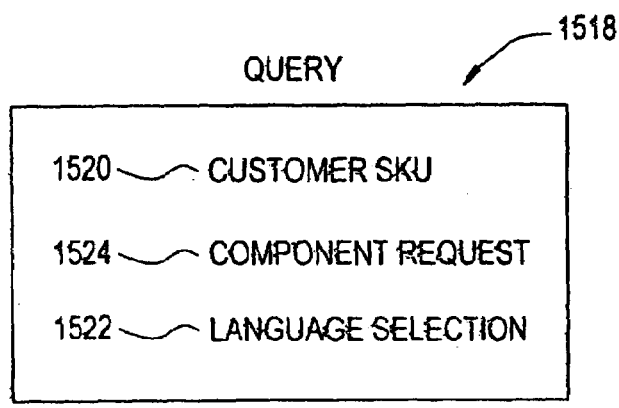
FIG. 15B is a diagram illustrating an exemplary user query for retrieving catalog data according to an embodiment of the invention.

A query may be provided to an end user in various forms. FIG. 15B is a diagram illustrating an exemplary user query for retrieving catalog data according to an embodiment of the invention. As shown, the user query 1518 may include a customer SKU 1520 associated with a product, a language selection 1522 in which information associated with the product is desired, and a component request 1524 associated with the product. As described above, the component may include a manufacturer product description (i.e., standardized product description), main specifications, extended specifications, a marketing description, an image, and a URL associated with the product. In this manner, an end user may tailor its query to obtain specific information associated with a product. In addition, numeric values may be normalized upon display as described above with reference to FIG. 14A.

In addition to submitting a query to obtain information associated with one product, an end user may wish to compare multiple products. Thus, as shown in FIG. 15C, the user query may permit a user to compare selected products within an identical category 1526 according to selected comparable attributes. By way of example, a selection of at least one of the set of attributes 1528 corresponding to the category 1526 may be obtained from a user. In addition, a selection of products 1530 within the category 1526 may be accepted. The selected attributes (e.g., attribute values) may then be obtained for the selected products 1530 from the catalog database (e.g., system product data file or customer database) and displayed. Thus, once the user submits this query, the selected comparable attributes 1532 for the selected products 1530 may be provided to permit a side-by-side comparison as shown.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described in the context of a computer system. However, it should be understood that the present invention is not limited to this arrangement, but instead would equally apply regardless of the type of products for which product data is captured. Accordingly, the present embodiments are to be considered as illustrative and not restrictive, and the invention is not to be limited to the details given herein, but may be modified within the scope and equivalents of the appended claims.

What is claimed is:

1. A method of capturing data for use in a catalog comprising:

capturing product data for a product according to a data model, the data model having one or more classes, each one of the one or more classes being defined by one or more categories, each of the one or more categories being defined by an attribute group having one or more attributes; and storing the captured product data in a product data system, the product data including:
- a system SKU product identifier that identifies the product within the product data system;
- a manufacturer SKU associated with the product assigned by the manufacturer that identifies the product within a product line of the manufacturer;
- at least one customer SKU assigned by the customer that identifies the product, each customer SKU being associated with a customer for which the product data is being stored for subsequent distribution to the customer, for use in a catalog, the customer being a manufacturer, retailer, or distributor of the product, thereby enabling the at least one customer to request customized distribution of product data for a particular product;
- a link from the product data to product information characterizing the product; and
- a customer identifier that identifies the customer to which the captured data is to be distributed, wherein the catalog is output to a user to display the captured data.

2. The method as recited in claim 1, wherein capturing product data includes:

classifying a product to be entered according to the data model; and rendering a data entry template associated with the category of the classified product, wherein the data entry template includes a listing of potential values associated with each of the attributes in the category of the classified product, wherein the listing of potential values identify values that are selectable as values for the associated attribute.

3. The method as recited in claim 2, wherein the rendering further includes repeating the listing of potential values for the classified product when the attribute group associated with the classified product is indicated to be a repeating group in the data model.

4. The method as recited in claim 1, wherein each attribute is associated with a possible value list including values that are selectable and selected searchable attributes are specified, wherein the step of capturing product data includes reviewing product information for a particular product and selecting specific values from the possible value list for each of the selected searchable attributes.

5. The method as recited in claim 4, wherein each attribute is further associated with a possible unit list including units that are selectable and wherein the step of capturing product data further includes selecting specific units from the possible unit list for at least some of the selected searchable attributes.

6. The method as recited in claim 1, further including creating a product header that is associated with the product, wherein creating the product header includes:

storing a system SKU associated with the product in the product header;

storing a manufacturer SKU associated with the product in the product header; and associating the product header with product information characterizing the product.

7. The method as recited in claim 6, wherein the product information includes one of the one or more categories and a manufacturer product description, the manufacturer product description describing standard features of the product.

8. The method as recited in claim 6, further including linking the product header to one or more images illustrating the product.

9. The method as recited in claim 6, further including linking the product header to a marketing description of the product.

10. The method as recited in claim 1, further including specifying one or more countries for which the product is adapted for sale.

11. The method as recited in claim 1, further including providing one or more possible countries that are selectable as countries for which the product is adapted for sale.

12. The method as recited in claim 1, further including linking to one or more related products that are recommended as compatible with the product.

13. The method as recited in claim 1, further including linking to platform compatibility information associated with the product indicating one or more platforms that are compatible with the product.

14. The method as recited in claim 1, further including providing one or more possible platforms that are selectable as platforms with which the product is compatible.

15. The method as recited in claim 1, wherein each attribute has an associated possible value list that identifies values that are selectable as values for the associated attribute and wherein storing the product data further includes storing selected attributes in an attribute table, each of the selected attributes being identified by a system SKU and having at least one of the values in the associated possible value list.

16. The method as recited in claim 1, wherein capturing product data for the product includes:
    classifying the product according to a data model having one or more classes, wherein each of the classes is arranged to identify one or more associated categories, and each of the categories is arranged to identify an associated attribute group having one or more attributes, each attribute having an associated possible value list that identifies values that are selectable as values for the associated attribute;
    selecting at least one of the values in the associated possible value list for selected attributes in the associated attribute group; and
    inputting the selected values for the product to the system product data file.

17. The method as recited in claim 16, wherein capturing data for the product further includes inputting one or more images illustrating the product to the system product data file.

18. The method as recited in claim 16, wherein capturing data for the product further includes inputting a marketing description associated with the product to the system product data file.

19. The method as recited in claim 16, wherein capturing data for the product further includes inputting to the system product data file one or more countries for which the product is adapted for sale.

20. The method as recited in claim 16, wherein capturing data for the product further includes inputting to the system product data file a list identifying one or more related products that are recommended as compatible with the product.

21. The method as recited in claim 16, wherein capturing data for the product further includes inputting to the system product data file platform compatibility information associated with the product indicating one or more platforms that are compatible with the product.

22. A computer-readable medium storing thereon computer-readable instructions for capturing data for use in a catalog, comprising:
    instructions for capturing product data for a product according to a data model, the data model having one or more classes, each one of the one or more classes being defined by one or more categories, each of the one or more categories being defined by an attribute group having one or more attributes;
    instructions for storing the captured product data in a product data system, the product data including:
        a system SKU product identifier that identifies the product within the product data system;
        a manufacturer SKU associated with the product assigned by the manufacturer that identifies the product within a product line of the manufacturer;
        at least one customer SKU assigned by the customer that identifies the product, each customer SKU being associated with a customer for which the product data is being stored for subsequent distribution to the customer for use in a catalog, the customer being a manufacturer, retailer, or distributor of the product, thereby enabling the at least one customer to request customized distribution of product data for a particular product;
        a link from the product data to product information characterizing the product;
        a customer identifier that identifies the customer to which the captured data is to be distributed; and
    instructions for outputting the catalog to a user to display the captured data.

23. A system for capturing data for use in a catalog, comprising:
    means for capturing product data for a product according to a data model, the data model having one or more classes, each one of the one or more classes being defined by one or more categories, each of the one or more categories being defined by an attribute group having one or more attributes;
    means for storing the captured product data in a product data system, the product data including:
        a system SKU product identifier that identifies the product within the product data system;
        a manufacturer SKU associated with the product assigned by the manufacturer that identifies the product within a product line of the manufacturer;
        at least one customer SKU assigned by the customer that identifies the product, each customer SKU being associated with a customer for which the product data is being stored for subsequent distribution to the customer, for use in a catalog, the customer being a manufacturer, retailer, or distributor of the product thereby enabling the at least one customer to request customized distribution of product data for a particular product;
        a link from the product data to product information characterizing the product;
        a customer identifier that identifies the customer to which the captured data is to be distributed; and
    means for outputting the catalog to a user to display the captured data.

24. A system for capturing data for use in a catalog comprising:
    a processor; and
    a memory, at least one of the processor and the memory being adapted for:

capturing product data for a product according to a data model, the data model having one or more classes, each one of the one or more classes being defined by one or more categories, each of the one or more categories being defined by an attribute group having one or more attributes; and storing the captured product data in a product data system, the product data including:

a system SKU product identifier that identifies the product within the product data system;

a manufacturer SKU associated with the product assigned by the manufacturer that identifies the product within a product line of the manufacturer;

at least one customer SKU assigned by the customer that identifies the product, each customer SKU being associated with a customer for which the product data is being stored for subsequent distribution to the customer, for use in a catalog, the customer being a manufacturer, retailer, or distributor of the product, thereby enabling the at least one customer to request customized distribution of product data for a particular product;

a link from the product data to product information characterizing the product; and a customer identifier that identifies the customer to which the captured data is to be distributed, wherein at least one of the processor and the memory are further adapted for outputting the catalog to a user to display the captured data.

25. A method of capturing data for use in a catalog comprising:

capturing product data for a product according to a data model, the data model having one or more classes, each one of the classes defined by one or more categories, each of the categories defined by an attribute group having one or more attributes; and storing the captured product data, associating product identification information to the stored captured product data, the product identification information including:

a manufacturer SKU assigned by the manufacturer that identifies the product;

a customer SKU that identifies the product, the customer SKU associated with a customer for which the product data is being stored for subsequent distribution to the customer for use in a catalog, thereby enabling the customer to request customized distribution of stored product data for a particular product; and a link from the product data to product information characterizing the product, wherein the catalog is output to a user to display the captured data.

26. The method of capturing data of claim 25, wherein the product information includes at least one of a category identifier to identify the category associated with the product, a manufacturer product description that describes features of the product, an image of the product, an image identifier of the product, or a marketing description that further describes features of the product.

27. The method of capturing data of claim 25, wherein the data model further includes a language table indicating languages in which the product and documentation associated with the product are available.

28. The method of capturing data of claim 25, wherein the data model further includes a country table indicating countries for which the product and documentation associated with the product are adapted for sale.

29. The method of capturing data of claim 25, wherein the data model further includes a related products table indicating related products that are recommended as related to the product.

30. The method of capturing data of claim 25, wherein the data mode further includes a data capture priority indicator that assigns a priority to the attribute for data capture.

31. The method of capturing data of claim 30, wherein the data capture priority indicator ranks attributes of the product for sorting and comparing products and product features.

* * * * *

UNITED STATES PATENT AND TRADEMARK OFFICE
CERTIFICATE OF CORRECTION

| | | |
|---|---|---|
| PATENT NO. | : 7,284,007 B1 | Page 1 of 1 |
| APPLICATION NO. | : 09/625745 | |
| DATED | : October 16, 2007 | |
| INVENTOR(S) | : de Heer et al. | |

It is certified that error appears in the above-identified patent and that said Letters Patent is hereby corrected as shown below:

On the Title Page
Please insert Item -- (60) This application claims priority to copending U.S. Provisional Application No. 60/152,510, filed on Sept. 2, 1999, which is hereby incorporated by reference in its entirety. --.

Signed and Sealed this
Twenty-sixth Day of April, 2011

David J. Kappos
*Director of the United States Patent and Trademark Office*